United States Patent
Wang et al.

(10) Patent No.: US 12,412,418 B1
(45) Date of Patent: Sep. 9, 2025

(54) APPARATUS FOR IDENTIFYING FINGERPRINT, AND ELECTRONIC DEVICE

(71) Applicant: SHENZHEN GOODIX TECHNOLOGY CO., LTD., Shenzhen (CN)

(72) Inventors: Yin Wang, Shenzhen (CN); Sichao Zhang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/895,797

(22) Filed: Sep. 25, 2024

(51) Int. Cl.
 *G06V 40/13* (2022.01)
(52) U.S. Cl.
 CPC ...... *G06V 40/1324* (2022.01); *G06V 40/1318* (2022.01)
(58) Field of Classification Search
 CPC ........... G06V 40/1324; G06V 40/1318; G06V 10/147; G02B 3/0056
 See application file for complete search history.

(56) References Cited

U.S. PATENT DOCUMENTS

| | | | |
|---|---|---|---|
| 2021/0056284 A1* | 2/2021 | Jiang | G06V 40/1335 |
| 2021/0305441 A1 | 9/2021 | Liu et al. | |
| 2022/0050994 A1* | 2/2022 | Zhang | G06V 40/1318 |

FOREIGN PATENT DOCUMENTS

| | | |
|---|---|---|
| CN | 111164607 A | 5/2020 |
| CN | 113065469 A | 7/2021 |
| CN | 215867892 U | 2/2022 |
| EP | 3809315 A1 | 4/2021 |

OTHER PUBLICATIONS

PCT International Search report of PCT/CN2023/077471 issued on Sep. 22, 2023.
Extended European search report of EP23923281.2 issued by EPO on May 7, 2025.

* cited by examiner

*Primary Examiner* — Abhishek Sarma
(74) *Attorney, Agent, or Firm* — Emerson, Thomson & Bennett, LLC; Roger D. Emerson; Seth J. Niemi

(57) ABSTRACT

Embodiments of the present disclosure provide an apparatus for identifying a fingerprint and an electronic device. The apparatus includes a plurality of fingerprint identification units distributed in an array, and each of the fingerprint identification units includes: a microlens, at least two light blocking layers, and a plurality of pixel units. Light-passing apertures in the at least two light blocking layers form a plurality of light guiding channels corresponding to the plurality of pixel units. The plurality of light guiding channels include a first light guiding channel and a second light guiding channel, an angle between a direction of the first light guiding channel and a first direction is a first angle, and an angle between a direction of the second light guiding channel and the first direction is a second angle, where the first angle is different from the second angle. The apparatus can have high fingerprint identification performance.

20 Claims, 12 Drawing Sheets

(a)

(b)

(c)

APPARATUS FOR IDENTIFYING FINGERPRINT, AND ELECTRONIC DEVICE

CROSS REFERENCE TO RELATED APPLICATIONS

The present application is a continuation of international application No. PCT/CN2023/077471, filed on Feb. 21, 2023, which is hereby incorporated by reference in its entirety.

TECHNICAL FIELD

The present disclosure relates to the technical field of optical fingerprints, and more specifically relates to an apparatus for identifying a fingerprint and an electronic device.

BACKGROUND

With the development of bioidentification technologies, fingerprint identification technologies are widely used in the fields, such as mobile terminal design, automotive electronics, and smart homes. In the field of mobile terminals, such as mobile phones, the performance requirements for fingerprint identification technologies are increasingly higher. On the one hand, an apparatus for identifying a fingerprint needs to be miniaturized and ultra-thin, and is adapted to installation in a miniaturized handheld terminal; and on the other hand, the apparatus for identifying a fingerprint further needs to have high fingerprint identification performance and a relatively accurate identification rate to meet user needs and improve user experience.

Therefore, how to improve the fingerprint identification performance of the apparatus for identifying a fingerprint in an electronic device is a technical problem to be urgently solved.

SUMMARY

Embodiments of the present disclosure provide an apparatus for identifying a fingerprint and an electronic device, which can improve the fingerprint identification performance.

In a first aspect, an apparatus for identifying a fingerprint is provided, which is configured to be arranged below a display screen of an electronic device to implement under-display optical fingerprint identification, where the apparatus for identifying a fingerprint includes: a plurality of fingerprint identification units distributed in an array, and each fingerprint identification unit among the plurality of fingerprint identification units includes: a microlens; at least two light blocking layers arranged below the microlens, where each light blocking layer among the at least two light blocking layers is provided with a light-passing aperture, and the light-passing aperture is configured to allow a fingerprint light signal that is reflected or scattered by a finger above the display screen, is then returned, and is converged via the microlens to pass through; and a plurality of pixel units arranged below the at least two light blocking layers, where the light-passing apertures in the at least two light blocking layers form a plurality of light guiding channels corresponding to the plurality of pixel units, and the plurality of pixel units are arranged below the plurality of light guiding channels with one-to-one correspondence therebetween; the plurality of light guiding channels include a first light guiding channel and a second light guiding channel, an angle between a direction of the first light guiding channel and a first direction is a first angle, and an angle between a direction of the second light guiding channel and the first direction is a second angle, where the first angle is different from the second angle, and the first direction is a direction normal to a plane where the plurality of pixel units are located; a position of a light-passing aperture in the first light guiding channel and located in an underlying light blocking layer among the at least two light blocking layers satisfies $0 \leq S_{11}/P_a \leq 1.4$, and a position of a light-passing aperture in the second light guiding channel and located in an underlying light blocking layer satisfies $0.7 \leq S_{12}/P_a \leq 2.8$, where $S_{11}$ is a distance from a center of the light-passing aperture in the first light guiding channel and located in the underlying light blocking layer to a center of projection of the microlens on the underlying light blocking layer, $S_{12}$ is a distance from a center of the light-passing aperture in the second light guiding channel and located in the underlying light blocking layer to the center of projection of the microlens on the underlying light blocking layer, and $P_a$ is an arrangement period of the plurality of pixel units; and the plurality of pixel units include a first pixel unit corresponding to the first light guiding channel and a second pixel unit corresponding to the second light guiding channel, the first pixel unit is configured to receive a first fingerprint light signal transmitted through the first light guiding channel, the second pixel unit is configured to receive a second fingerprint light signal transmitted through the second light guiding channel, and the first fingerprint light signal and/or the second fingerprint light signal are/is used for fingerprint identification.

Through a technical solution of an embodiment of the present disclosure, an apparatus for identifying a fingerprint is provided, which has a first light guiding channel and a second light guiding channel in different directions and angles, a first pixel unit corresponding to the first light guiding channel can receive a first fingerprint light signal transmitted through the first light guiding channel, a second pixel unit corresponding to the second light guiding channel can receive a second fingerprint light signal transmitted through the second light guiding channel, and angles of the first fingerprint light signal and the second fingerprint light signal are different from each other. Therefore, the first pixel unit and the second pixel unit may have different light collection angles. The apparatus for identifying a fingerprint provided in the embodiment of the present disclosure can have advantages of both a large light collection angle and a small light collection angle, can improve the fingerprint imaging quality in different scenarios, is conductive to restoring a three-dimensional shape of an actual fingerprint, and is conductive to improving the identification performance and anti-counterfeiting performance of the apparatus for identifying a fingerprint. Further, in the embodiment of the present disclosure, not only are the first light guiding channel and the second light guiding channel in different angles designed, but also a ratio of a distance from a center of a light-passing aperture in an underlying light blocking layer to a center of projection of a microlens on the underlying light blocking layer to an arrangement period of the plurality of pixel units is constrained to constrain a relative positional relationship between the light-passing aperture in the underlying light blocking layer and the pixel units, thereby relatively effectively and accurately controlling the first light guiding channel and the second light guiding channel to transmit fingerprint light signals in different directions and different angles to corresponding first pixel unit and second pixel unit, and comprehensively improving the optical imaging performance and fingerprint identification performance of the apparatus for identifying a fingerprint.

In some possible embodiments, a position of a light-passing aperture in the first light guiding channel and located in a non-underlying light blocking layer among the at least two light blocking layers satisfies $0 \leq S_{21}/P_a \leq 1.2$, and a position of a light-passing aperture in the second light guiding channel and located in a non-underlying light blocking layer satisfies $0.5 \leq S_{22}/P_a \leq 2.5$, where $S_{21}$ is a distance from a center of the light-passing aperture in the first light guiding channel and located in the non-underlying light blocking layer to a center of projection of the microlens on the non-underlying light blocking layer, and $S_{22}$ is a distance from a center of the light-passing aperture in the second light guiding channel and located in a non-underlying light blocking layer to the center of the projection of the microlens on the non-underlying light blocking layer.

Through the technical solution of the embodiment of the present disclosure, for the design of each light guiding channel in the fingerprint identification unit, not only is the ratio of the distance from the center of the light-passing aperture in the underlying light blocking layer to the center of the projection of the microlens on the underlying light blocking layer to the arrangement period of the plurality of pixel units considered, but also a ratio of the distance from the center of the light-passing aperture in the non-underlying light blocking layer to the center of the projection of the microlens on the non-underlying light blocking layer to the arrangement period of the plurality of pixel units is considered. This technical solution can relatively accurately characterize the relative positional relationship between the light-passing apertures in the underlying light blocking layer and the non-underlying light blocking layer and the pixel units, so that the light guiding channel has better light guiding performance for the corresponding pixel unit, and the fingerprint light signal can be transmitted to the corresponding pixel unit accurately through the light-passing apertures in the light guiding channel and located in the underlying light blocking layer and the non-underlying light blocking layer, to achieve effective fingerprint imaging with better quality.

In some possible embodiments, the positions of the light-passing apertures in the first light guiding channel and located in the underlying light blocking layer and the non-underlying light blocking layer of the at least two light blocking layers satisfy $0 \leq (S_{11}-S_{21})/(Z_1-Z_2) \leq 0.35$, and the positions of the light-passing apertures in the second light guiding channel and located in the underlying light blocking layer and the non-underlying light blocking layer satisfy $0.25 \leq (S_{12}-S_{22})/(Z_1-Z_2) \leq 0.8$ and $(S_{12}-S_{22})/(Z_1-Z_2) > (S_{11}-S_{21})/(Z_1-Z_2)$; where $S_{21}$ is the distance from the center of the light-passing aperture in the first light guiding channel and located in the non-underlying light blocking layer to the center of the projection of the microlens on the non-underlying light blocking layer, $S_{22}$ is the distance from the center of the light-passing aperture in the second light guiding channel and located in a non-underlying light blocking layer to the center of the projection of the microlens on the non-underlying light blocking layer, $Z_1$ is a depth distance between a lower surface of the underlying light blocking layer and a lower surface of the microlens, and $Z_2$ is a depth distance between a lower surface of the non-underlying light blocking layer and the lower surface of the microlens.

In the technical solution provided in this embodiment, by designing the values of $(S_{11}-S_{21})/(Z_1-Z_2)$ and $(S_{12}-S_{22})/(Z_1-Z_2)$, the relative positional relationship between the light-passing apertures in the plurality of light guiding channels and located in the underlying light blocking layer and the light-passing apertures in the plurality of light guiding channels and located in the non-underlying light blocking layer can be designed, and then light guiding directions and angles of the plurality of light guiding channels can be designed. The value of $(S_{11}-S_{21})/(Z_1-Z_2)$ can be used to characterize the angle of the first light guiding channel, and the value of $(S_{12}-S_{22})/(Z_1-Z_2)$ can be used to characterize the angle of the second light guiding channel. Therefore, through the technical solution of the embodiment of the present disclosure, pixel units corresponding to the plurality of light guiding channels can receive a fingerprint light signal in a preset design angle, so as to achieve better fingerprint imaging effects and fingerprint identification performance.

In some possible embodiments, the plurality of light guiding channels further include a third light guiding channel, an angle between a direction of the third light guiding channel and the first direction is a third angle, and the third angle is different from the first angle and the second angle; and the plurality of pixel units include a third pixel unit corresponding to the third light guiding channel, the third pixel unit is configured to receive a third fingerprint light signal transmitted through the third light guiding channel, and at least one of the first fingerprint light signal, the second fingerprint light signal, and the third fingerprint light signal is used for fingerprint identification.

Through the technical solution of this embodiment, the apparatus for identifying a fingerprint has three light guiding channels in different angles and three pixel units in different light collection angles. Therefore, the apparatus for identifying a fingerprint can be adapted to fingerprint identification in more different scenarios, and improve the fingerprint imaging quality in more scenarios, thereby further improving the fingerprint identification performance of the apparatus for identifying a fingerprint.

In some possible embodiments, a position of a light-passing aperture in the third light guiding channel and located in the underlying light blocking layer satisfies $0.5 \leq S_{13}/P_a \leq 2.2$, where $S_{13}$ is a distance from a center of the light-passing aperture in the third light guiding channel and located in the underlying light blocking layer to a center of projection of the microlens on the underlying light blocking layer.

In the technical solution of this embodiment, by controlling the position of the light-passing aperture in the third light guiding channel and located in the underlying light blocking layer, the third light guiding channel can be relatively effectively and accurately controlled to transmit the third fingerprint light signal in a target direction and a target angle to the third pixel unit among the plurality of pixel units, to still further improve the optical imaging performance of the apparatus for identifying a fingerprint.

In some possible embodiments, a position of a light-passing aperture in the third light guiding channel and located in a non-underlying light blocking layer of the at least two light blocking layers satisfies $0.4 \leq S_{23}/P_a \leq 1.8$, where $S_{23}$ is a distance from a center of the light-passing aperture in the third light guiding channel and located in the non-underlying light blocking layer to a center of projection of the microlens on the non-underlying light blocking layer.

Through the technical solution of this embodiment, the relative positional relationship between the light-passing apertures in the third light guiding channel and located in the non-underlying light blocking layer and the pixel units can be comprehensively controlled, so that the third light guiding channel has better light guiding performance for the corresponding third pixel unit, and the third fingerprint light signal can be transmitted to the third pixel unit accurately through the light-passing apertures located in the underlying light blocking layer and the non-underlying light blocking layer of the third light guiding channel, to achieve effective fingerprint imaging with better quality.

In some possible embodiments, the positions of the light-passing apertures in the third light guiding channel and located in the non-underlying light blocking layer satisfy $0.2 \leq (S_{13}-S_{23})/(Z_1-Z_2) \leq 0.7$ and $(S_{12}-S_{22})/(Z_1-Z_2) > (S_{13}-S_{23})/(Z_1-Z_2) > (S_{11}-S_{21})/(Z_1-Z_2)$, where $S_{13}$ is the distance from the center of the light-passing aperture in the third light guiding channel and located in the underlying light blocking layer to the center of the projection of the microlens on the underlying light blocking layer, $S_{23}$ is the distance from the center of the light-passing aperture in the third light guiding channel and located in the non-underlying light blocking layer to the center of the projection of the microlens on the non-underlying light blocking layer, $S_{21}$ is the distance from the center of the light-passing aperture in the first light guiding channel and located in the non-underlying light blocking layer to the center of the projection of the microlens on the non-underlying light blocking layer, $S_{22}$ is the distance from the center of the light-passing aperture in the second light guiding channel and located in a non-underlying light blocking layer to the center of the projection of the microlens on the non-underlying light blocking layer, $Z_1$ is the depth distance between the lower surface of the underlying light blocking layer and the lower surface of the microlens, and $Z_2$ is the depth distance between the lower surface of the non-underlying light blocking layer and the lower surface of the microlens.

In the technical solution provided in this embodiment, by designing the value of $(S_{13}-S_{23})/(Z_1-Z_2)$, the relative positional relationship between the light-passing apertures in the third light guiding channel and located in the underlying light blocking layer and the light-passing apertures in the third light guiding channel and located in the non-underlying light blocking layer can be designed, and then a light guiding direction and a light guiding angle of the third light guiding channel can be designed. Therefore, through the technical solution of this embodiment, the third pixel unit corresponding to the third light guiding channel can receive the fingerprint light signal in the preset design angle, so as to achieve better fingerprint imaging effects and fingerprint identification performance.

In some possible embodiments, a position of a light-passing aperture in each light guiding channel among the plurality of light guiding channels and located in the underlying light blocking layer further satisfies $0 \leq S_1/Z_1 \leq 0.6$, where $S_1$ is a distance from a center of the light-passing aperture in each light guiding channel and located in the underlying light blocking layer to a center of projection of the microlens on the underlying light blocking layer.

In the technical solution of this embodiment, the positions of the plurality of light-passing apertures in the underlying light blocking layer can be further constrained based on the depth distance between the lower surface of the underlying light blocking layer and the lower surface of the microlens and the distance from the center of each light-passing aperture in the light guiding channel and located in the underlying light blocking layer to the center of the projection of the microlens on the underlying light blocking layer, thereby further optimizing the light guiding performance of the light guiding channel, that is, allowing the fingerprint light signal in the target direction to pass through, while blocking fingerprint light signals in non-target directions, and reducing the impact of stray light on imaging.

In some possible embodiments, the maximum diameter $D_1$ of the light-passing aperture in the underlying light blocking layer and the maximum caliber (CA) of the microlens satisfy $0.005 \leq D_1/CA \leq 0.2$.

Through the technical solution of this embodiment, the maximum diameter $D_1$ of each light-passing aperture in the underlying light blocking layer and the maximum caliber (CA) of the microlens are constrained to satisfy $D_1/CA \leq 0.2$, and a proportional relationship between a light passing area of the microlens and a size of the light-passing aperture in the underlying light blocking layer can be comprehensively considered. When the proportional relationship is less than or equal to 0.2, each light-passing aperture in the underlying light blocking layer below the current microlens can favorably shield stray light transmitted through adjacent microlenses, and reduce image aliasing, thereby improving the imaging contrast, or in other words, improving the image contrast, and improving the fingerprint image quality. In addition, in the embodiment of the present disclosure, $D_1/CA \geq 0.005$ is further constrained, thereby ensuring that enough light signals can pass through each light-passing aperture in the underlying light blocking layer to ensure the imaging brightness. Therefore, the image brightness and image contrast can be balanced using the solution of the embodiment of the present disclosure, thereby improving the image quality and the identification success rate.

In some possible embodiments, the maximum diameter $D_1$ of the light-passing aperture in the underlying light blocking layer and the maximum caliber (CA) of the microlens satisfy $0.05 \leq D_1/CA \leq 0.1$.

In some possible embodiments, a maximum diameter $D_2$ of the light-passing aperture in the non-underlying light blocking layer among the at least two light blocking layers and the maximum caliber (CA) of the microlens satisfy $0.05 \leq D_2/CA \leq 0.5$.

Through the technical solution of this embodiment, the proportional relationship between the light passing area of the microlens and a size of the light-passing aperture in the non-underlying light blocking layer can be further comprehensively considered, so that the light-passing apertures in the non-underlying light blocking layer and the underlying light blocking layer can cooperate with each other, thereby reducing stray light through the light-passing apertures, and further improving the imaging contrast and brightness, to improve the fingerprint image quality.

In some possible embodiments, the maximum diameter $D_2$ of the light-passing aperture in the non-underlying light blocking layer and the maximum caliber (CA) of the microlens satisfy $0.08 \leq D_2/CA \leq 0.3$.

In some possible embodiments, a radius of curvature (ROC) of the microlens and the depth distance $Z_1$ between the lower surface of the underlying light blocking layer and the lower surface of the microlens satisfy $0.3 \leq ROC/Z_1 \leq 0.6$.

In the technical solution of this embodiment, the proportional relationship between the radius of curvature (ROC) of the microlens and the depth distance $Z_1$ between the lower surface of the underlying light blocking layer and the lower surface of the microlens is constrained, thereby constraining the proportional relationship between the focus of the microlens and the position of the underlying light blocking layer, allowing the microlens to focus the fingerprint light signal to a vicinity of each light-passing aperture in the underlying light blocking layer or to each light-passing aperture in the underlying light blocking layer, and improving the fingerprint image quality and the identification performance of the apparatus for identifying a fingerprint.

In some possible embodiments, a radius of curvature (ROC) of the microlens and the depth distance $Z_1$ between the lower surface of the underlying light blocking layer and the lower surface of the microlens satisfy $0.4 \leq ROC/Z_1 \leq 0.55$.

In some possible embodiments, the depth distance $Z_2$ between the lower surface of the non-underlying light blocking layer among the at least two light blocking layers and the lower surface of the microlens and the depth distance $Z_1$ between the lower surface of the underlying light blocking layer and the lower surface of the microlens satisfy $0.1 \leq Z_2/Z_1 \leq 0.9$.

Through the technical solution of this embodiment, the relative positional relationship between each of the non-underlying light blocking layer and the underlying light blocking layer among the at least two light blocking layers and the microlens can be designed, so that the non-underlying light blocking layer and the underlying light blocking layer cooperate with each other to form a light guiding channel with good light guiding performance. When $Z_2/Z_1 \geq 0.1$, it can prevent the distance between the non-underlying light blocking layer and the lower surface of the microlens from being too small, thereby affecting the signal amount of the fingerprint light signal received by the light-passing aperture in the non-underlying light blocking layer. When $Z_2/Z_1 \leq 0.9$, it can prevent the distance between the non-underlying light blocking layer 322 and the underlying light blocking layer 321 from being too small, thereby affecting the length of the light guiding channel formed by the at least two light blocking layers, to affect the direction guiding effects of the light guiding channel on the fingerprint light signal.

In some possible embodiments, the depth distance $Z_2$ between the lower surface of the non-underlying light blocking layer and the lower surface of the microlens and the depth distance $Z_1$ between the lower surface of the underlying light blocking layer and the lower surface of the microlens satisfy $0.5 \leq Z_2/Z_1 \leq 0.9$.

In some possible embodiments, an arrangement period $P_b$ of the microlens in the apparatus for identifying a fingerprint and the arrangement period $P_a$ of the pixel units in the apparatus for identifying a fingerprint satisfy $3 \leq P_b/P_a$.

Through the technical solution of this embodiment, the apparatus for identifying a fingerprint can be facilitated to implement pixel units with different light collection angles, to improve the fingerprint identification effects of the apparatus for identifying a fingerprint in different application scenarios.

In some possible embodiments, the arrangement period $P_b$ of the microlens in the apparatus for identifying a fingerprint and the arrangement period $P_a$ of the pixel units in the apparatus for identifying a fingerprint satisfy $3 \leq P_b/P_a \leq 4$.

Through the technical solution of this embodiment, the fingerprint identification performance and overall design costs of the apparatus for identifying a fingerprint can be balanced, so that the apparatus for identifying a fingerprint has better comprehensive performance, which is beneficial to its promotion and use in various types of electronic devices.

In some possible embodiments, the arrangement period $P_b$ of the microlens in the apparatus for identifying a fingerprint and the arrangement period $P_a$ of the pixel units in the apparatus for identifying a fingerprint satisfy $P_b/P_a=3$; and the position of the light-passing aperture in the first guiding channel and located in the underlying light blocking layer among the at least two light blocking layers satisfies $0 \leq S_{11}/P_a \leq 0.7$, and the position of the light-passing aperture in the second light guiding channel and located in the underlying light blocking layer satisfies $0.7 \leq S_{12}/P_a \leq 2.1$.

In some possible embodiments, the position of the light-passing aperture in the first light guiding channel and located in the non-underlying light blocking layer among the at least two light blocking layers satisfies $0 \leq S_{21}/P_a \leq 0.5$, and the position of the light-passing aperture in the second light guiding channel and located in a non-underlying light blocking layer satisfies $0.5 \leq S_{22}/P_a \leq 1.9$, where $S_{21}$ is the distance from the center of the light-passing aperture in the first light guiding channel and located in the non-underlying light blocking layer to the center of the projection of the microlens on the non-underlying light blocking layer, and $S_{22}$ is the distance from the center of the light-passing aperture in the second light guiding channel and located in a non-underlying light blocking layer to the center of the projection of the microlens on the non-underlying light blocking layer.

In some possible embodiments, the plurality of light guiding channels further include the third light guiding channel, and the position of the light-passing aperture in the third light guiding channel and located in the underlying light blocking layer satisfies $0.5 \leq S_{13}/P_a \leq 1.5$, where $S_{13}$ is the distance from the center of the light-passing aperture in the third light guiding channel and located in the underlying light blocking layer to the center of the projection of the microlens on the underlying light blocking layer.

In some possible embodiments, the position of the light-passing aperture in the third guiding channel and located in the non-underlying light blocking layer among the at least two light blocking layers satisfies $0.4 \leq S_{23}/P_a \leq 1.3$, where $S_{23}$ is the distance from the center of the light-passing aperture in the third light guiding channel and located in the non-underlying light blocking layer to the center of the projection of the microlens on the non-underlying light blocking layer.

In some possible embodiments, the arrangement period $P_b$ of the microlens in the apparatus for identifying a fingerprint and the arrangement period $P_a$ of the pixel units in the apparatus for identifying a fingerprint satisfy $P_b/P_a=4$; and the position of the light-passing aperture in the first guiding channel and located in the underlying light blocking layer among the at least two light blocking layers satisfies $0 \leq S_{11}/P_a \leq 1.4$, and the position of the light-passing aperture in the second light guiding channel and located in the underlying light blocking layer satisfies $1.4 \leq S_{12}/P_a \leq 2.8$.

In some possible embodiments, the position of the light-passing aperture in the first light guiding channel and located in the non-underlying light blocking layer among the at least two light blocking layers satisfies $0 \leq S_{21}/P_a \leq 1.2$, and the position of the light-passing aperture in the second light guiding channel and located in a non-underlying light blocking layer satisfies $1.2 \leq S_{22}/P_a \leq 2.5$, where $S_{21}$ is the distance from the center of the light-passing aperture in the first light guiding channel and located in the non-underlying light blocking layer to the center of the projection of the microlens on the non-underlying light blocking layer, and $S_{22}$ is the distance from the center of the light-passing aperture in the second light guiding channel and located in a non-underlying light blocking layer to the center of the projection of the microlens on the non-underlying light blocking layer.

In some possible embodiments, the plurality of light guiding channels further include the third light guiding channel, and the position of the light-passing aperture in the third light guiding channel and located in the underlying light blocking layer satisfies $1 \leq S_{13}/P_a \leq 2.2$, where $S_{13}$ is the distance from the center of the light-passing aperture in the third light guiding channel and located in the underlying light blocking layer to the center of the projection of the microlens on the underlying light blocking layer.

In some possible embodiments, the position of the light-passing aperture in the third guiding channel and located in the non-underlying light blocking layer among the at least two light blocking layers satisfies $0.8 \leq S_{23}/P_a \leq 1.8$, where $S_{23}$ is the distance from the center of the light-passing aperture in the third light guiding channel and located in the non-underlying light blocking layer to the center of the projection of the microlens on the non-underlying light blocking layer.

In some possible embodiments, the arrangement period $P_b$ of the microlens in the apparatus for identifying a fingerprint satisfies $5 \ \mu m \leq P_b \leq 100 \ \mu m$.

In some possible embodiments, the arrangement period $P_b$ of the microlens in the apparatus for identifying a fingerprint satisfies $20 \ \mu m \leq P_b \leq 80 \ \mu m$.

In some possible embodiments, the plurality of pixel units are an N×N pixel unit array, where N is a positive integer greater than 2.

In some possible embodiments, the plurality of pixel units are a 3×3 pixel unit array, and in the 3×3 pixel unit array, 1 pixel unit located at the center is the first pixel unit, and 4 pixel units located at four corners are 4 of the second pixel units.

In some possible embodiments, the plurality of pixel units are a 4×4 pixel unit array, and in the 4×4 pixel unit array, 2×2 pixel units located at the center are a plurality of the first pixel units, and 4 pixel units located at four corners are 4 of the second pixel units.

Through the technical solutions of the above two embodiments, in a fingerprint identification unit, the microlens may correspond to a 3×3 pixel unit array, and pixel units at different positions in the pixel unit array may have different light collection angles, thus facilitating the technical implementations of the apparatus for identifying a fingerprint having both a large light collection angle and a small light collection angle in the present disclosure.

In some possible embodiments, in each fingerprint identification unit among the plurality of fingerprint identification units, adjacent pixel units among the plurality of pixel units are closely arranged with no spacing therebetween.

In the technical solution of this embodiment, there is better correspondence between the plurality of pixel units in the fingerprint identification unit and the microlenses, the structure of the whole fingerprint identification unit is relatively compact, and there is less stray light in the light signals received by the plurality of pixel units, so that the fingerprint imaging quality is better.

In some possible embodiments, in each fingerprint identification unit among the plurality of fingerprint identification units, there is a spacing between adjacent pixel units among the plurality of pixel units.

Through the technical solution of this embodiment, the pixel units in the fingerprint identification unit may have large light collection angles, thereby enabling the fingerprint identification unit to be adapted to more application scenarios.

In a second aspect, an electronic device is provided, including: a display screen; and the apparatus for identifying a fingerprint in the first aspect or any one possible embodiment of the first aspect, where the apparatus for identifying a fingerprint is arranged below the display screen to implement under-display optical fingerprint identification.

DESCRIPTION OF EMBODIMENTS

Technical solutions of embodiments of the present disclosure will be described below with reference to the drawings.

It should be understood that the embodiments of the present disclosure can be applied to an optical fingerprint system, including but not limited to a system for identifying an optical fingerprint and a product based on optical fingerprint imaging. The embodiments of the present disclosure are illustrated only taking the optical fingerprint system as an example, but should not impose any limitation on the embodiments of the present disclosure. The embodiments of the present disclosure are also adapted to other systems using an optical imaging technology.

As a common application scenario, an optical fingerprint system provided in an embodiment of the present disclosure can be applied to smart phones, tablet computers, and other mobile terminals with display screens or other electronic devices. More specifically, in the above electronic devices, the apparatus for identifying a fingerprint may be embodied as an optical fingerprint apparatus, which may be arranged in a local region or a whole region below a display screen, thus forming an under-display optical fingerprint system.

Figure 1:
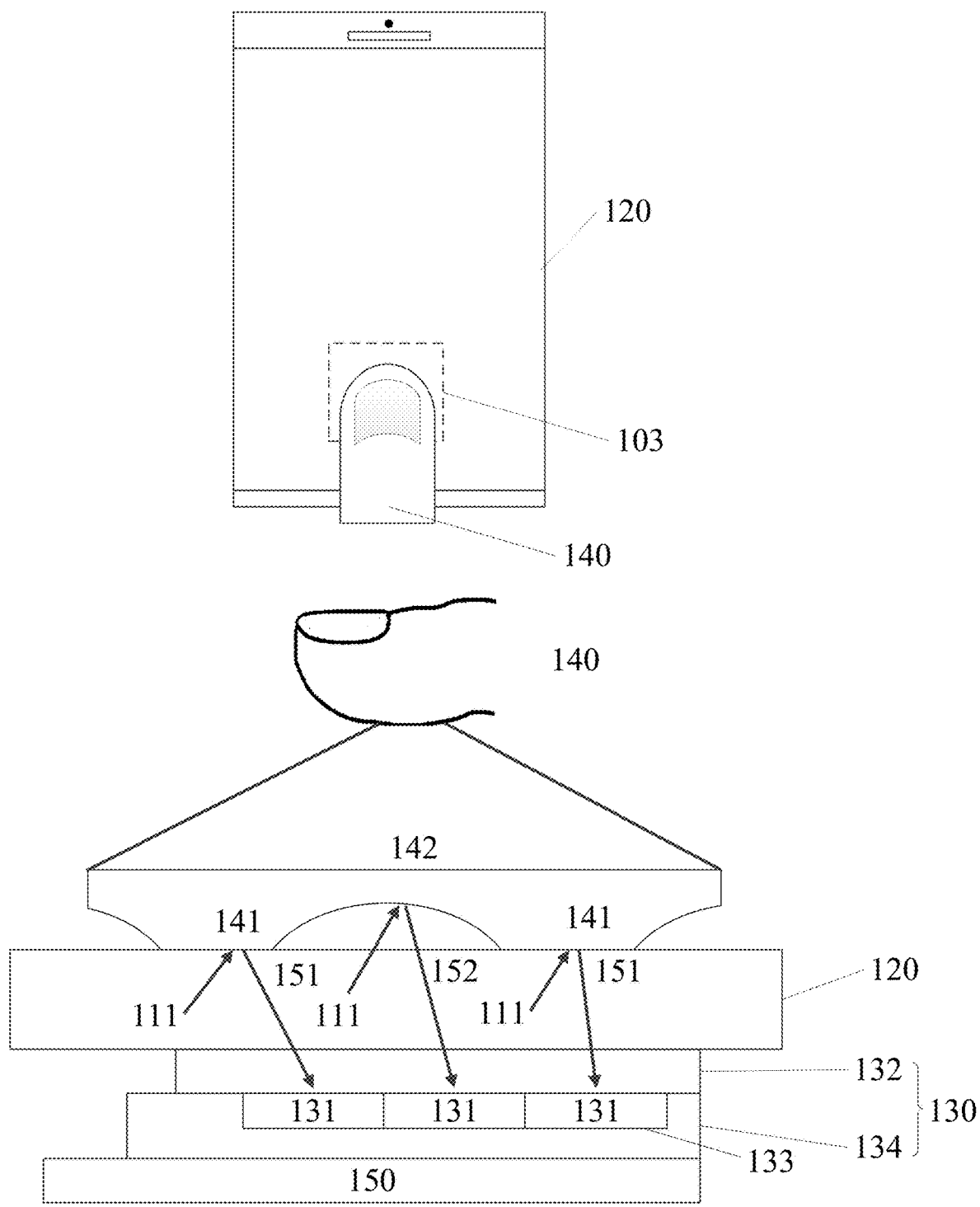
FIG. 1 is a schematic structural diagram of an electronic device adapted to implement embodiments of the present disclosure.

FIG. 1 shows a schematic structural diagram of an electronic device that can be adapted to implement embodiments of the present disclosure. The electronic device 10 includes a display screen 120 and an optical fingerprint apparatus 130, where the optical fingerprint apparatus 130 is arranged in a local region below the display screen 120. The optical fingerprint apparatus 130 includes a fingerprint image sensor. The fingerprint image sensor includes a pixel array 133 having a plurality of pixel units 131 (also referred to as a sensing unit, an optical sensing unit, a pixel, etc.). A region where the pixel array 133 is located or a sensing region thereof is a fingerprint detection region 103 of the optical fingerprint apparatus 130. As shown in FIG. 1, the fingerprint detection region 103 is located in a display region of the display screen 120. In an alternative embodiment, the optical fingerprint apparatus 130 may also be arranged at other positions, such as a non-light-transmitting region on a side surface of the display screen 120 or on the edge of the electronic device 10, and light signals in at least a partial display region of the display screen 120 are guided by light path design to the optical fingerprint apparatus 130, so that the fingerprint detection region 103 is actually located in the display region of the display screen 120.

It should be understood that the area of the fingerprint detection region 103 may be different from the area of the pixel array of the optical fingerprint apparatus 130. For example, by lens imaging light path design, reflective folding light path design, or other light path design such as light convergence or reflection, the area of the fingerprint detection region 103 of the optional fingerprint apparatus 130 may be made larger than the area of the pixel array of the optical fingerprint apparatus 130.

As an optional implementation, as shown in FIG. 1, the optical fingerprint apparatus 130 includes a light detection part 134 and an optical component 132. The light detection part 134 includes a pixel array 133 and a reading circuit and other auxiliary circuits electrically connected to the pixel array 133, and can be fabricated on a chip (die) through a semiconductor process, such as an optical imaging chip or a fingerprint image sensor. The optical component 132 may be arranged above the pixel array of the light detection part 134, and may specifically include a light guiding layer or a light path guiding structure and other optical elements. The light guiding layer or the light path guiding structure is mainly configured to guide reflected light that is reflected back from a finger surface to the pixel array for optical detection.

Various implementation schemes are available for the light guiding layer or the light path guiding structure of the optical component 132. For example, in some embodiments, the light guiding layer or the light path guiding structure may be an optical lens layer, has one or more lenses, and is configured to converge the reflected light reflected from a finger to the pixel array of the light detection part 134 thereunder, so that the pixel array can perform imaging based on the reflected light, thereby obtaining a fingerprint image of the finger. Optionally, a pinhole may also be formed in the light path of the lens unit in the optical lens layer. The pinhole may cooperate with the optical lens layer in expanding a visual field of the optical fingerprint apparatus, to improve the fingerprint imaging effects of the optical fingerprint apparatus 130.

As an optional embodiment, the display screen 120 may be a display screen having a self-luminous display unit, for example, an organic light-emitting diode (OLED) display screen or a micro-LED display screen. Taking the OLED display screen as an example, the optical fingerprint apparatus 130 may use a display unit (i.e., an OLED light source) located in the fingerprint detection region 103 of the OLED display screen 120 as an excitation light source for optical fingerprint detection. When the finger 140 presses the fingerprint detection region 103, the display screen 120 emits a light beam 111 to the target finger 140 above the fingerprint detection region 103. The light 111 is reflected from the surface of the finger 140 to form reflected light or is scattered via the inside of the finger 140 to form scattered light. In relevant patent applications, for ease of description, the above-mentioned reflected light and scattered light are collectively referred to as reflected light. Because a ridge and a valley of a fingerprint have different light reflective powers, reflected light 151 from the ridge of the fingerprint and reflected light 152 from the valley of the fingerprint have different light intensities. After passing through the optical component 132, the reflected light is received by the optical detection part 134 in the optical fingerprint apparatus 130 and converted into a corresponding electrical signal, that is, a fingerprint detection signal. Based on the fingerprint detection signal, fingerprint image data can be obtained, and fingerprint matching and validation can be further performed, thereby implementing the optical fingerprint identification function at the electronic device 10.

In other embodiments, the optical fingerprint apparatus 130 may also use a built-in light source or an external light source to provide a light signal for fingerprint detection. In this case, the optical fingerprint apparatus 130 may be adapted to a non-self-luminous display screen, such as a liquid crystal display or other passively luminous display screens.

Optionally, as shown in FIG. 1, the electronic device 10 may further include a circuit board 150 arranged below the optical fingerprint apparatus 130. The optical fingerprint apparatus 130 can realize electrical interconnection and signal transmission with other peripheral circuits or other components of the electronic device 10 via the circuit board 150. For example, the optical fingerprint apparatus 130 can receive a control signal from a processing unit of the electronic device 10 via the circuit board 150, and can also output the fingerprint detection signal from the optical fingerprint apparatus 130 to, e.g., the processing unit or a control unit of the electronic device 10 via the circuit board 150.

In the above-mentioned embodiments of the present disclosure, the optical component 132 may include a microlens layer and at least one light blocking layer. The microlens layer has a microlens array formed by a plurality of microlenses. At least one light blocking layer is arranged between the microlens layer and the fingerprint image sensor, and the at least one light blocking layer is provided with a plurality of light-passing apertures. After passing through the finger 140 (i.e., the above reflected light 151 and 152), the fingerprint light signal is converged via the plurality of microlenses in the microlens layer, and then enters the pixel unit 131 of the fingerprint image sensor via the plurality of light-passing apertures in the at least one light blocking layer, so that the fingerprint image sensor forms a fingerprint image.

Figure 2:
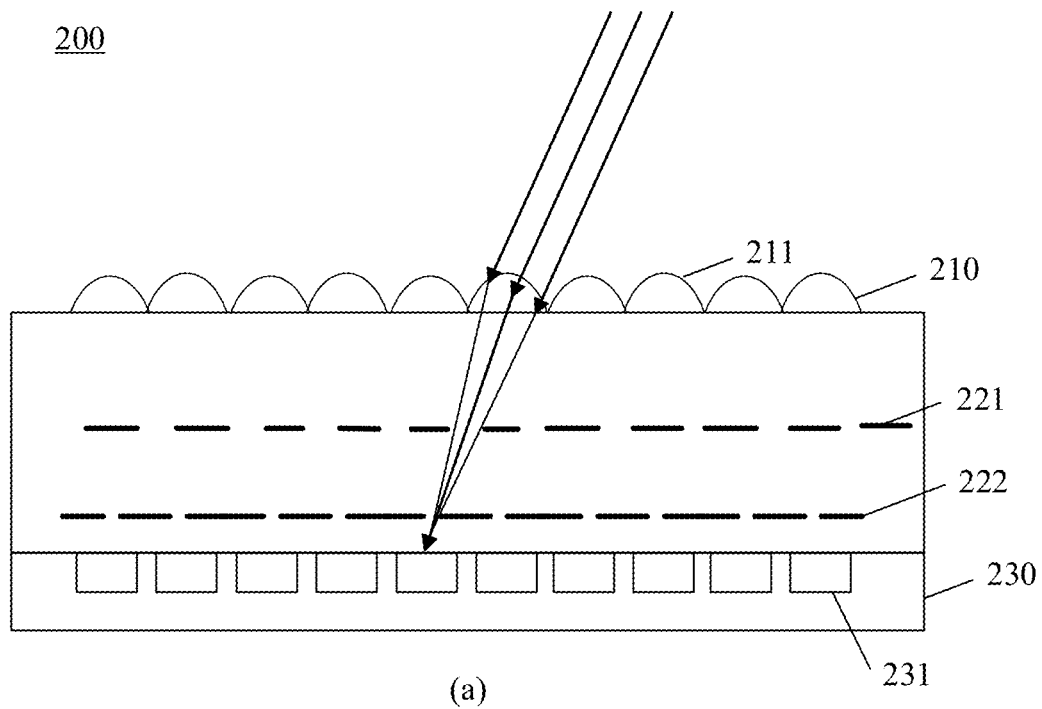
FIG. 2 is a schematic structural block diagram of two apparatuses for identifying a fingerprint provided in embodiments of the present disclosure.
Figure 2:
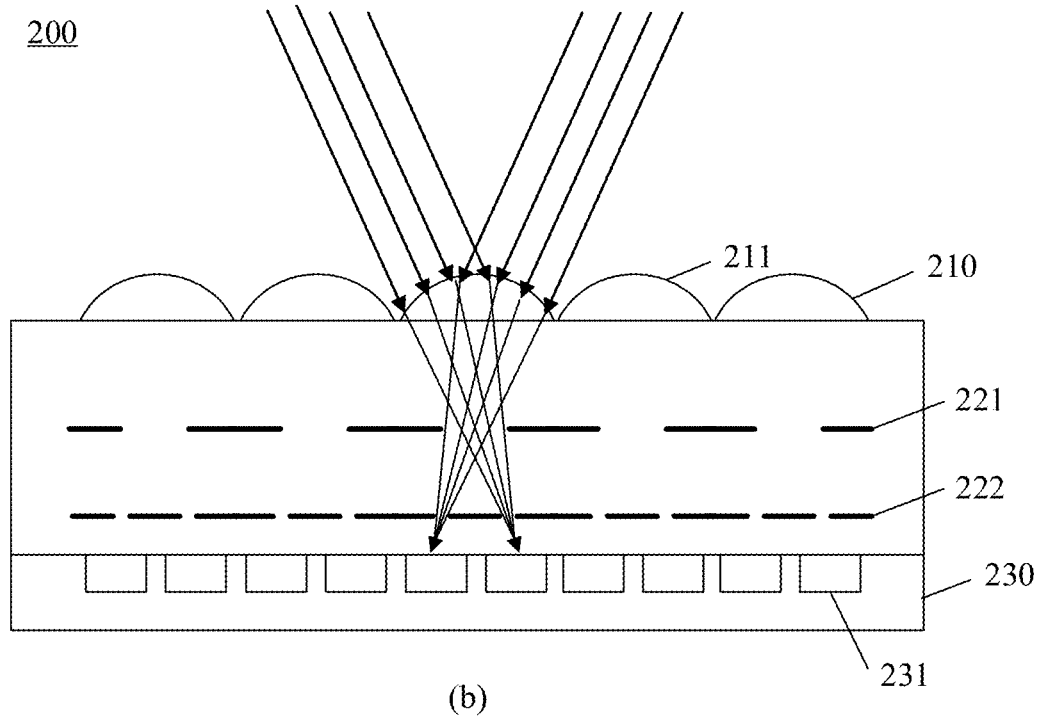

As an example, FIG. 2 shows a schematic structural block diagram of two apparatuses 200 for identifying a fingerprint.

As shown in FIG. 2, the apparatus 200 for identifying a fingerprint may include: a microlens layer 210, at least one light blocking layer (e.g., two light blocking layers 221 and 222 shown in the figure), and a fingerprint image sensor 230. A plurality of light-passing apertures are formed in the at least one light blocking layer to form a plurality of light guiding channels. There is one-to-one correspondence between the plurality of light guiding channels and a plurality of pixel units 231 in the fingerprint image sensor 230. After being converged via the microlens layer 210, the fingerprint light signal enters the plurality of pixel units 231 via the plurality of light guiding channels, to achieve optical imaging of the fingerprint.

In the embodiment shown in FIG. 2(a), each microlens 211 in the microlens layer 210 corresponds to a pixel unit 231 in the fingerprint image sensor 230. A light guiding channel is formed between the microlens 211 and the corresponding pixel unit 231. The light guiding channel is mainly configured to transmit fingerprint light signals in a same direction converged via the microlens 211 to the corresponding pixel unit 231. Each pixel unit 231 in the fingerprint image sensor 230 is configured to receive the fingerprint light signals in the same direction.

In the embodiment shown in FIG. 2(b), each microlens 211 in the microlens layer 210 corresponds to the plurality of pixel units 231 in the fingerprint image sensor 230. A plurality of light guiding channels are formed between each microlens 211 and the corresponding plurality of pixel units 231. There is one-to-one correspondence between the plurality of light guiding channels and the plurality of pixel units 231, and the plurality of light guiding channels are configured to transmit fingerprint light signals in multiple directions converged via the microlens 211 to the corresponding pixel unit 231. Different pixel units 231 in the fingerprint image sensor 230 can be configured to receive the fingerprint light signals in different directions.

In the embodiment shown in FIG. 2, when the apparatus 200 for identifying a fingerprint includes a plurality of light blocking layers, an angle of the light guiding channel is an angle between a connection line of centers of the plurality of light-passing apertures in the light guiding channel and a normal to a plane where the fingerprint image sensor 230 is located. When the apparatus 200 for identifying a fingerprint includes a light blocking layer, the angle of the light guiding channel is an angle between a connection line of the light-passing aperture in the light guiding channel and an optical center of the corresponding microlens 211 and the normal to the plane where the fingerprint image sensor 230 is located. In the present disclosure, the angle of the light guiding channel is also referred to as a light collection angle of a corresponding pixel unit 231 thereof.

Figure 3:
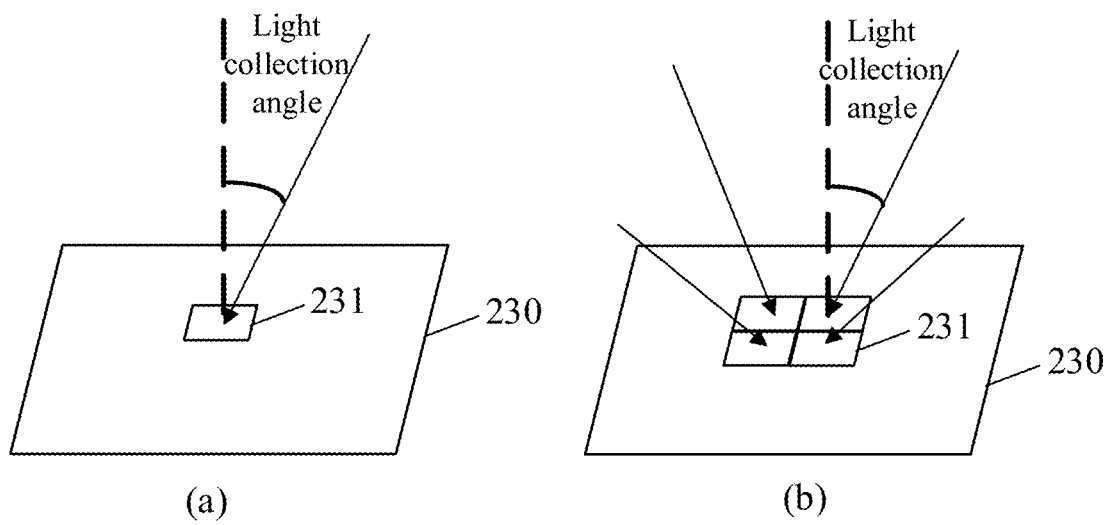
FIG. 3 is a schematic diagram of a light collection angle of a pixel unit in the two embodiments shown in FIG. 2.

FIG. 3 shows a schematic diagram of a light collection angle of the pixel unit 231 in the two embodiments shown in FIG. 2. FIG. 3(a) corresponds to the embodiment shown in FIG. 2(a), and FIG. 3(b) corresponds to the embodiment shown in FIG. 2(b). As shown in FIG. 3(b), although different pixel units 231 can receive fingerprint light signals in different directions, light collection angles of different pixel units 231 are still a same angle. Therefore, in the two embodiments shown in FIG. 2, different pixel units 231 in the fingerprint image sensor 230 are configured to receive fingerprint light signals in a same light collection angle.

When the light collection angle changes, a corresponding identification region of the same pixel unit 231 on the finger also changes accordingly. For ease of understanding, FIG. 4 shows a schematic diagram of the light collection angle and an identification region of the pixel unit 231.

Figure 4:
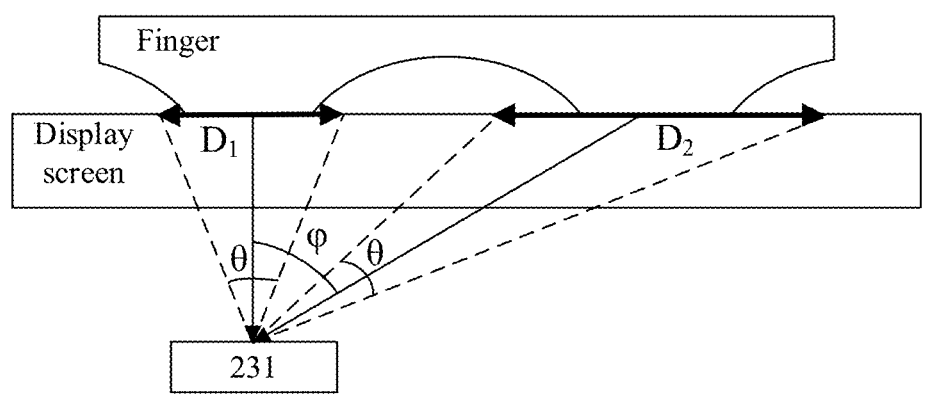
FIG. 4 is a schematic diagram of a light collection angle and an identification region of a pixel unit provided in an embodiment of the present disclosure.

As shown in FIG. 4, when the field angle of the pixel unit 231 is θ, if the light collection angle of the pixel unit 231 is 0°, the corresponding identification region of the pixel unit 231 on the finger is a circular region with a diameter of D1. If the light collection angle of the pixel unit 231 is a large angle φ, the corresponding identification region of the pixel unit 231 on the finger is a circular region with a diameter of D2, where D2 is larger than D1.

Therefore, under the same field angle, the smaller the light collection angle of the pixel unit 231 is, the smaller the corresponding identification region thereof on the finger is, and the more likely the pixel unit 231 is to receive a single type of fingerprint light signals, that is, fingerprint ridge signals or fingerprint valley signals, and the larger the amount of signals received by the pixel unit 231 is. Otherwise, the larger the light collection angle of the pixel unit 231 is, the larger the corresponding identification region thereof on the finger is, and the more likely the pixel unit is to receive different types of fingerprint light signals, that is, the more easily the ridge (or valley) signals are interfered by the valley (or ridge) signals, and the smaller the amount of signals received by the pixel unit 231 is. In this case, the smaller the light collection angle of the pixel unit 231 is, the better it is.

Figure 5:
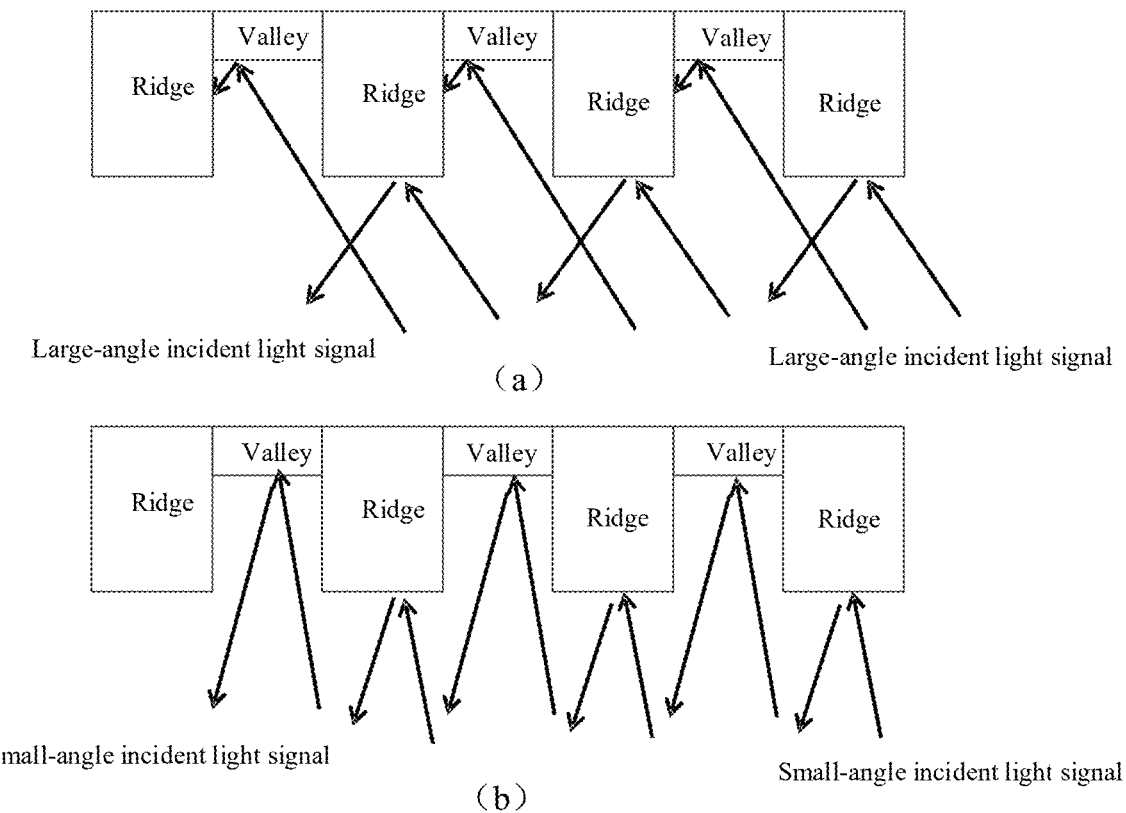
FIG. 5 is a schematic diagram of reflection of light signals in different angles by a fingerprint of finger provided in an embodiment of the present disclosure.

However, on the other hand, since a fingerprint of the finger is a three-dimensional surface, the fingerprint reflects light signals in different angles differently, so that different light collection angles have another impact on fingerprint imaging. Specifically, FIG. 5 shows a schematic diagram of reflection of light signals in different angles by a fingerprint of a finger.

As shown in FIG. 5(a), when light is incident at a large angle, reflected light from the fingerprint valley is more easily shielded by a side wall of the fingerprint ridge, thereby increasing the ridge-valley signal difference to increase the signal amount. As shown in FIG. 5(b), when light is incident at a small angle, reflected light from the fingerprint valley is not easily shielded by the side wall of the fingerprint ridge, and the ridge-valley signal difference is not as large as that when the reflected light is shielded. In this case, when light is incident at a large angle, the larger the angle of the reflected light from the fingerprint of the finger is, the larger the light collection angle of the pixel unit 231 that receives the large-angle reflected light signal is, and the larger the amount of signals received by the pixel unit 231 is. Otherwise, when light is incident at a small angle, the smaller the angle of reflected light from the fingerprint of the finger is, the smaller the light collection angle of the pixel unit 231 that receives the small-angle reflected light signal is, and the smaller the amount of signals received by the pixel unit 231 is. In this case, the larger the light collection angle of the pixel unit 231 is, the better it is.

As can be seen from the above contents, a large light collection angle (or a small light collection angle) can have a positive or negative impact on the fingerprint signal under different working conditions. Factors, such as the contact between the finger and the screen, the fingerprint shape and period, all have impacts on the fingerprint imaging, so that there is the case that the identification region dominates the fingerprint signal amount of the pixel unit 231 or the side wall blocks light and dominates the fingerprint signal amount of the pixel unit 231.

For example, when the finger is in good contact with the screen, fingerprint ridge imaging mainly uses transmitted light imaging, and fingerprint valley imaging mainly uses reflected light imaging. Therefore, there is large ridge-valley signal difference, and light blocking of the side wall of the fingerprint ridge has little impact on the fingerprint imaging. In this case, the identification region dominates the fingerprint imaging quality.

When the finger is not in good contact with the screen, both the fingerprint ridge and the fingerprint valley use reflected light imaging. In this case, the light blocking of the side wall of the fingerprint ridge has great impact on the fingerprint imaging, so that the light blocking of the side wall dominates the fingerprint imaging quality. In related technologies, for example, in the embodiment shown in FIG. 2 above, each pixel unit 231 in the fingerprint image sensor 230 has the same light collection angle, thereby failing to balance improvement of the fingerprint imaging quality in different scenarios, and resulting in poor identification performance of the apparatus 200 for identifying a fingerprint.

In view of this, the present disclosure provides a novel apparatus for identifying a fingerprint, in which some pixel units in the fingerprint image sensor have large light collection angles, and other pixel units have small light collection angles, so that the apparatus for identifying a fingerprint can have the advantages of both large light collection angles and small light collection angles, and can improve the fingerprint imaging quality in different scenarios, thereby improving the identification performance of the apparatus for identifying a fingerprint.

The apparatus for identifying a fingerprint in the embodiment of the present disclosure is introduced in detail below with reference to FIGS. 6 to 15.

It should be noted that, for ease of understanding, in the embodiments shown below, the same reference numerals are used for the same structures, and for simplicity, detailed description of the same structures is omitted.

Figure 6:
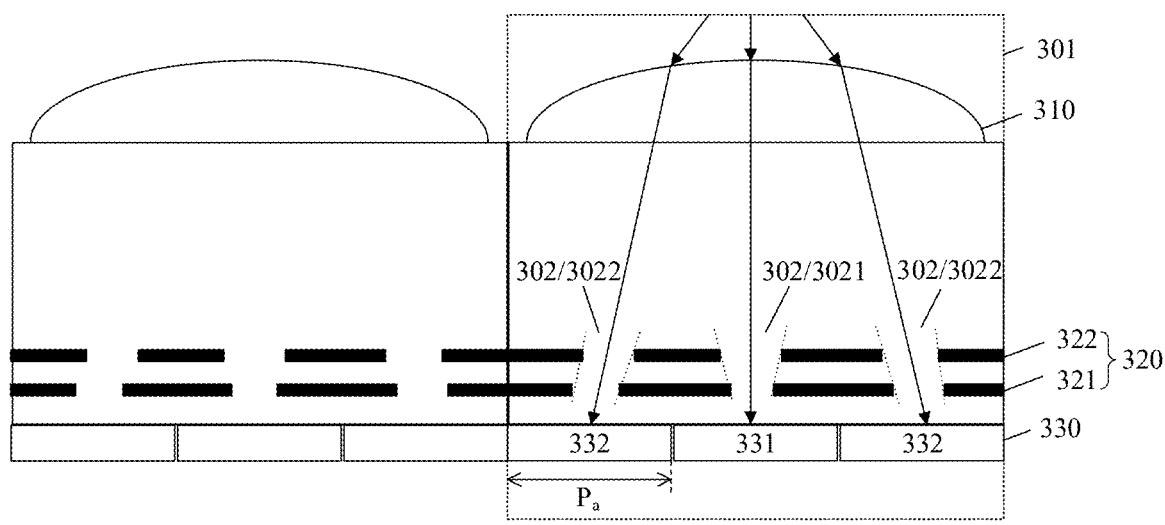
FIG. 6 is a schematic structural diagram of an apparatus for identifying a fingerprint provided in an embodiment of the present disclosure.

FIG. 6 is a schematic structural diagram of an apparatus 300 for identifying a fingerprint provided in an embodiment of the present disclosure. The apparatus 300 for identifying a fingerprint is configured to be arranged below a display screen of an electronic device, to implement under-display optical fingerprint identification.

The apparatus 300 for identifying a fingerprint includes: a plurality of fingerprint identification units 301 distributed in an array, and each fingerprint identification unit 301 among the plurality of fingerprint identification units 301 includes: a microlens 310, at least two light blocking layers 420 (for example, FIG. 6 shows two light blocking layers 321 and 322), and a plurality of pixel units 330.

Specifically, at least two light blocking layers 320 are arranged below the microlens 310, each light blocking layer among the at least two light blocking layers 320 is provided with a light-passing aperture, and the light-passing aperture is configured to allow a fingerprint light signal that is reflected or scattered by a finger above the display screen, is then returned, and is converged via the microlens 310 to pass through.

A plurality of pixel units 330 are arranged below the at least two light blocking layers 320, the light-passing apertures in the at least two light blocking layers 320 form a plurality of light guiding channels 302 corresponding to the plurality of pixel units 330, and the plurality of pixel units 330 are arranged below the plurality of light guiding channels 302 with one-to-one correspondence therebetween.

The plurality of light guiding channels 302 include a first light guiding channel 3021 and a second light guiding channel 3022, an angle between a direction of the first light guiding channel 3021 and a first direction is a first angle, and an angle between a direction of the second light guiding channel 3022 and the first direction is a second angle, where the first angle is different from the second angle, and the first direction is a direction normal to a plane where the plurality of pixel units 330 are located.

A position of a light-passing aperture in the first light guiding channel 3021 and located in an underlying light blocking layer 321 among the at least two light blocking layers 320 satisfies $0 \leq S_{11}/P_a \leq 1.4$, and a position of a light-passing aperture in the second light guiding channel 3022 and located in an underlying light blocking layer 321 satisfies $0.7 \leq S_{12}/P_a \leq 2.8$, where $S_{11}$ is a distance from a center of the light-passing aperture in the first light guiding channel 3021 and located in the underlying light blocking layer 321 to a center of projection of the microlens 310 on the underlying light blocking layer 321, $S_{12}$ is a distance from a center of the light-passing aperture in the second light guiding channel 3022 and located in the underlying light blocking layer 321 to the center of the projection of the microlens 310 on the underlying light blocking layer 321, and $P_a$ is an arrangement period of the plurality of pixel units 330.

The plurality of pixel units 330 include a first pixel unit 331 corresponding to the first light guiding channel 3021 and a second pixel unit 332 corresponding to the second light guiding channel 3022, the first pixel unit 331 is configured to receive a first fingerprint light signal transmitted through the first light guiding channel 3021, the second pixel unit 332 is configured to receive a second fingerprint light signal transmitted through the second light guiding channel 3022, and the first fingerprint light signal and/or the second fingerprint light signal are/is used for fingerprint identification.

Specifically, in the embodiment of the present disclosure, the microlens 310 is a convex lens with a convergence function. The at least two light blocking layers 320 are made of a light absorbing material, and can absorb most light signals in an environment. The light-passing apertures formed in the at least two light blocking layers 320 can be configured to allow light signals in the environment to pass through, for example, a fingerprint light signal that is reflected or scattered by a finger, and converged via the microlens 310. The at least two light blocking layers 320 can be connected to each other through a transparent dielectric layer, and a top light blocking layer among the at least two light blocking layers 320 and the microlens 310, as well as the underlying light blocking layer among the at least two light blocking layers 320 and the plurality of pixel units 330, may also be connected to each other through a transparent dielectric layer.

The plurality of pixel units 330 may be a plurality of pixel units in a fingerprint image sensor, and may be configured to sense a light signal and convert the light signal into a corresponding electrical signal. The fingerprint image sensor where the plurality of pixel units 330 are located may specifically be a chip structure, and the microlens 310 and the at least two light blocking layers 320 may be integrated with the chip, or may be separately provided above the chip.

Among the plurality of pixel units 330, each pixel unit 330 only receives a fingerprint light signal transmitted through a corresponding light guiding channel 302 thereof, and the light-passing apertures in the at least two light blocking layers 320 form the light guiding channel 302 corresponding to each pixel unit 330. A direction of a connection line of centers of the plurality of light-passing apertures in each light guiding channel 302 is the direction of the light guiding channel 302. The light guiding channel 302 is mainly configured to allow fingerprint light signals in a same direction to pass through. In other words, the direction of each light guiding channel 302 is the same as the direction of the fingerprint light signal transmitted through the light guiding channel 302.

An angle between the connection line of the centers of the plurality of light-passing apertures in the light guiding channel 302 and a normal line of the plane where the plurality of pixel units 330 are located can be referred to as an angle of the light guiding channel 302, or the angle of the light guiding channel 302 can also be referred to as a light collection angle of the corresponding pixel unit 330 thereof.

The light guiding channel 302 may include at least one first light guiding channel 3021 and at least one second light guiding channel 3022. An angle of the first light guiding channel 3021 is different from an angle of the second light guiding channel 3022. When the number of first light guiding channels 3021 is a plural number, angles of the plurality of first light guiding channels 3021 may be the same. Similarly, when the number of second light guiding channels 3022 is a plural number, angles of the plurality of second light guiding channels 3022 may be the same.

The pixel unit 330 may include at least one first pixel unit 331 corresponding to the first light guiding channel 3021 and at least one second pixel unit 332 corresponding to the second light guiding channel 3022. The at least one first pixel unit 331 is arranged below the bottom of the at least one first light guiding channel 3021 with one-to-one correspondence therebetween, and the at least one second pixel unit 332 is arranged below the bottom of the at least one second light guiding channel 3022 with one-to-one correspondence therebetween.

As an example, as shown in FIG. 6, the light guiding channel 302 may include a first light guiding channel 3021 and a plurality of second light guiding channels 3022. An angle between the direction of the first light guiding channel 3021 and the direction normal to the plane where the plurality of pixel units 330 are located (also referred to as the first direction, for ease of description) is the first angle, which may be referred to as the angle of the first light guiding channel 3021. Optionally, in the embodiment shown in FIG. 6, the first angle may be 0°. In addition, the angle between the direction of the second light guiding channel 3022 and the direction normal (first direction) to the plane where the plurality of pixel units 330 are located is the second angle, which may be referred to as the angle of the second light guiding channel 3022. Optionally, in the embodiment shown in FIG. 6, the second angle may be any angle between 0° and 90°.

The first pixel unit 331 is configured to receive the first fingerprint light signal that is converged via the microlens 310 and transmitted through the first light guiding channel 3021. The second pixel unit 332 is configured to receive the second fingerprint light signal that is converged via the microlens 310 and transmitted through the second light guiding channel 3022. The direction of the first fingerprint light signal is different from the direction of the second fingerprint light signal, and the angle between the first fingerprint light signal and the first direction is also different from the angle between the second fingerprint light signal and the first direction.

The angles of the first fingerprint light signal and the second fingerprint light signal are different from each other. Therefore, the first pixel unit 331 and the second pixel unit 332 may have different light collection angles. The apparatus 300 for identifying a fingerprint provided in the embodiment of the present disclosure can have advantages of both a large light collection angle and a small light collection angle, can improve the fingerprint imaging quality in different scenarios, is conducive to restoring a three-dimensional shape of an actual fingerprint, and is conductive to improving the identification performance and anti-counterfeiting performance of the apparatus for identifying a fingerprint.

Further, a position of a light-passing aperture in the first light guiding channel 3021 and located in an underlying light blocking layer 321 among the at least two light blocking layers 320 satisfies $0 \leq S_{11}/P_a \leq 1.4$, and a position of a light-passing aperture in the second light guiding channel and located in an underlying light blocking layer 321 satisfies $0.7 \leq S_{12}/P_a \leq 2.8$, where $S_{11}$ is a distance from a center of the light-passing aperture in the first light guiding channel 3021 and located in the underlying light blocking layer 321 to a center of projection of the microlens 310 on the underlying light blocking layer 321, $S_{12}$ is a distance from a center of the light-passing aperture in the second light guiding channel 3022 and located in the underlying light blocking layer 321 to the center of the projection of the microlens 310 on the underlying light blocking layer 321, and $P_a$ is an arrangement period of the plurality of pixel units 330.

Specifically, among the at least two light blocking layers 320, the underlying light blocking layer 321 is a light blocking layer closest to the plurality of pixel units 330, and the position of the light-passing aperture in the underlying light blocking layer 321 has a great impact on each of the angle of the light guiding channel 302, the light collection angle of the pixel unit 330, and the imaging quality of the pixel unit 330. In the embodiment of the present disclosure, the position of the light-passing aperture in the underlying light blocking layer 321 is arranged based on consideration of a ratio of the distance from the center of the light-passing aperture to the center of the projection of the microlens 310 on the underlying light blocking layer 321 to the arrangement period of the plurality of pixel units 330, and therefore can relatively accurately characterize the relative positional relationship between the light-passing apertures in the underlying light blocking layer 321 and the pixel units 330, so that the fingerprint light signal can be transmitted to the corresponding pixel unit 330 accurately through the light-passing aperture in the underlying light blocking layer 321, to achieve effective fingerprint imaging with better quality.

By controlling the positions of the light-passing apertures the first light guiding channel 3021 and located in the underlying light blocking layer 321 and the second light guiding channel 3022, the first light guiding channel 3021 and the second light guiding channel 3022 can be relatively effectively and accurately controlled to transmit fingerprint light signals in different directions and different angles to the first pixel unit 331 and the second pixel unit 332 among the plurality of pixel units 330, thereby comprehensively improving the optical imaging performance of the apparatus 300 for identifying a fingerprint.

Optionally, in some embodiments, the plurality of light guiding channels 302 further include a third light guiding channel, an angle between a direction of the third light guiding channel and the first direction is a third angle, and the third angle is different from the above-mentioned first angle and the above-mentioned second angle. The plurality of pixel units 330 include a third pixel unit corresponding to the third light guiding channel, the third pixel unit is configured to receive a third fingerprint light signal transmitted through the third light guiding channel, and at least one of the third fingerprint light signal, the above-mentioned first angle, and the above-mentioned second angle is used for fingerprint identification.

Through the technical solution of this embodiment, the plurality of pixel units in the apparatus 300 for identifying a fingerprint may have has three different light collection angles. Therefore, the apparatus 300 for identifying a fingerprint can be adapted to fingerprint identification in more different scenarios, and improve the fingerprint imaging quality in more scenarios, thereby further improving the identification performance of the apparatus for identifying a fingerprint.

As an example and non-restrictively, a position of a light-passing aperture in the third light guiding channel and located in the underlying light blocking layer 321 satisfies $0.5 \leq S_{13}/P_a \leq 2.2$, where $S_{13}$ is a distance from a center of a light-passing aperture in the third light guiding channel and located in an underlying light blocking layer 321 to a center of projection of the microlens 310 on the underlying light blocking layer 321.

Through this technical solution, by controlling the position of the light-passing aperture in the third light guiding channel and located in the underlying light blocking layer 321, the third light guiding channel can be relatively effectively and accurately controlled to transmit the third fingerprint light signal in a target direction and a target angle to the third pixel unit among the plurality of pixel units 330, to still further improve the optical imaging performance of the apparatus 300 for identifying a fingerprint.

Optionally, in some embodiments, the positions of the light-passing apertures located in the underlying light blocking layer 321 of the first light guiding channel, the second light guiding channel, and the third light guiding channel satisfy $S_{11}/P_a < S_{13}/P_a < S_{12}/P_a$.

Figure 7:
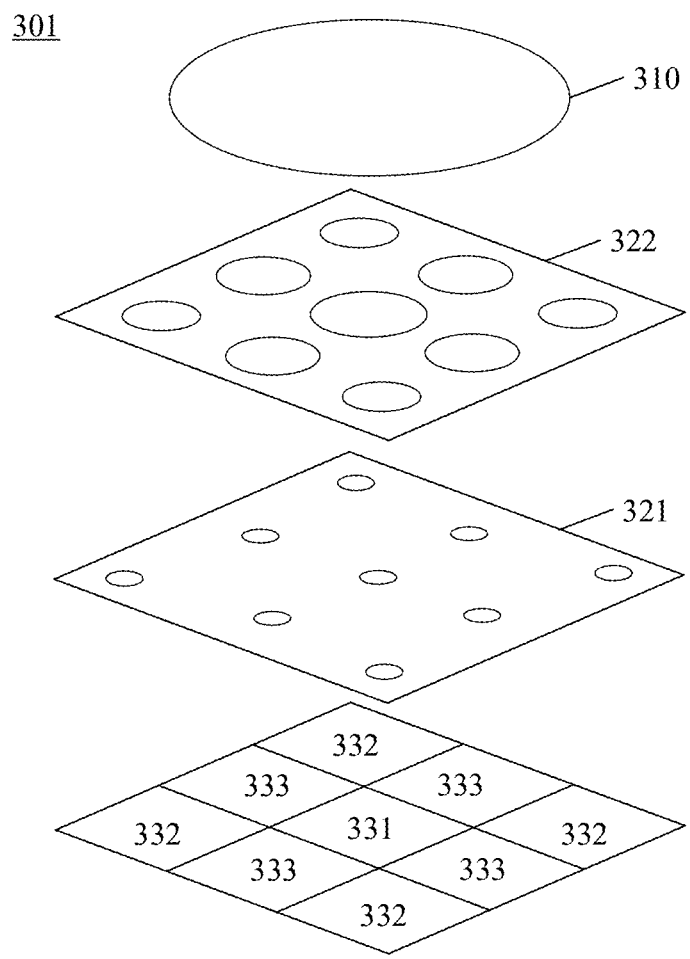
FIG. 7 is a schematic exploded three-dimensional view of a fingerprint identification unit provided in an embodiment of the present disclosure.

For ease of understanding, FIG. 7 shows a schematic exploded three-dimensional view of a fingerprint identification unit 301 provided in an embodiment of the present disclosure.

As shown in FIG. 7, in a fingerprint identification unit 301, the microlens 310 corresponds to a 3×3 pixel unit array. In the 3×3 pixel unit array, 1 pixel unit located at the center is the first pixel unit 331, and 4 pixel units located at four corners are 4 of the second pixel units 332. In addition, except for the 1 first pixel unit 331 and the 4 second pixel units 332, other 4 pixel units are 4 third pixel units 333.

Figure 8:
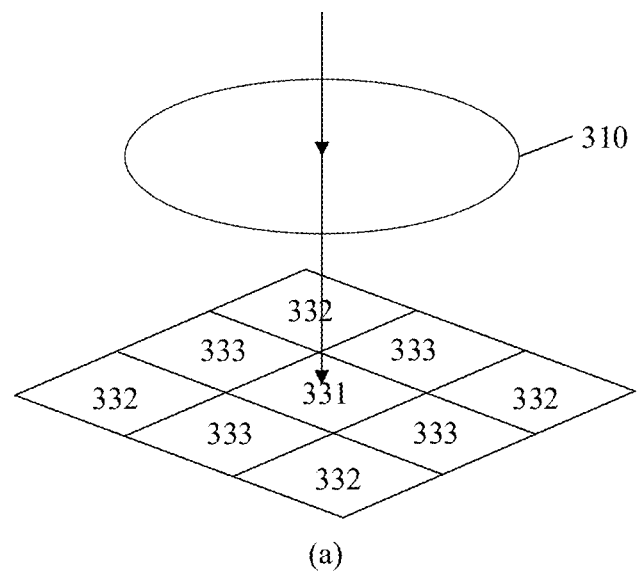
FIG. 8 is a schematic diagram of light paths of different pixel units in a 3×3 pixel unit array in the embodiment shown in FIG. 7.
Figure 8:
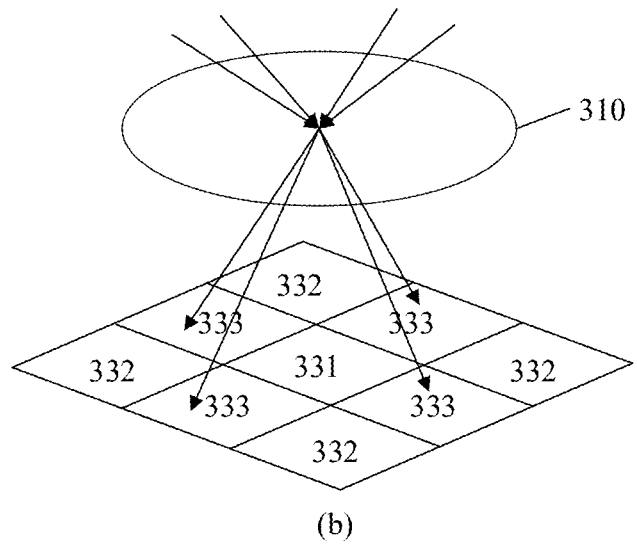
Figure 8:
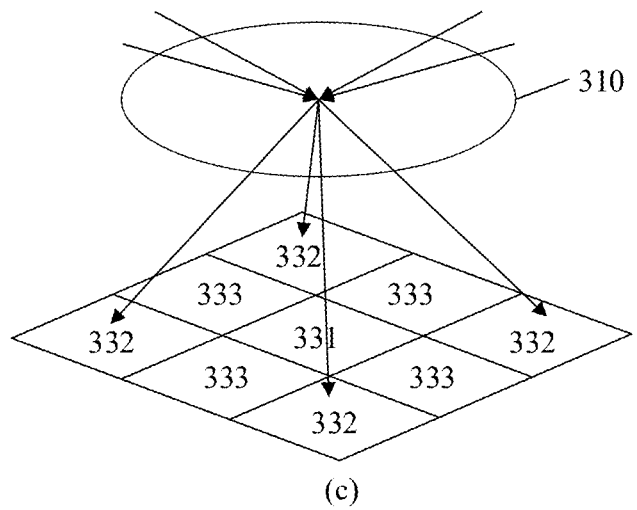

FIG. 8 shows a schematic diagram of light paths of different pixel units in the 3×3 pixel unit array in the embodiment shown in FIG. 7. For ease of illustration, at least two light blocking layers 320 are omitted in FIG. 8. It can be understood that light signals received by different pixel units in the 3×3 pixel unit array are all transmitted through light guiding channels formed by light-passing apertures in the at least two light blocking layers 320, where the first pixel unit 331 corresponds to the first light guiding channel 3021, the second pixel unit 332 corresponds to the second light guiding channel 3022, and the third pixel unit 333 corresponds to the third light guiding channel.

As shown in FIG. 8(a), the first pixel unit 331 located at the center can receive the first fingerprint light signal transmitted through the first light guiding channel 3021 and incident perpendicularly to a plane where the plurality of pixel units are located. The light collection angle of the first pixel unit 331 is 0°.

As shown in FIGS. 8(b)-(c), the 4 third pixel units 333 located on the edge and the 4 second pixel units 332 located at four corners can receive an inclined second fingerprint light signal and an inclined third fingerprint light signal transmitted through the 4 second light guiding channels 3022 and the 4 third light guiding channels respectively, where the angle of the third fingerprint light signal is smaller than the angle of the second fingerprint light signal. The light collection angles of the third pixel unit 333 and the second pixel unit 332 are both larger than 0° and smaller than 90°, and the light collection angle of the third pixel unit 333 is smaller than the light collection angle of the second pixel unit 332.

Figure 9:
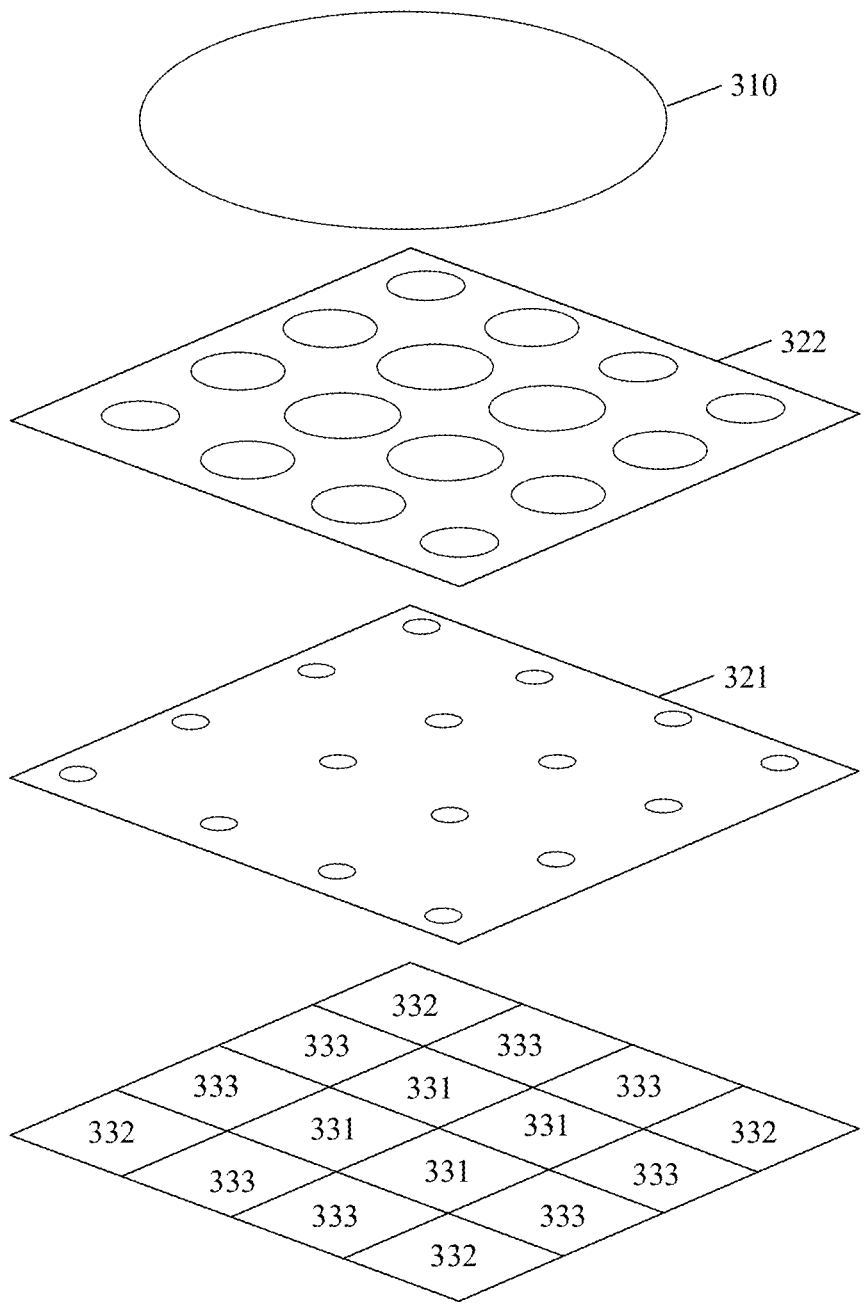
FIG. 9 is another schematic exploded three-dimensional view of a fingerprint identification unit provided in an embodiment of the present disclosure.

FIG. 9 shows another schematic exploded three-dimensional view of a fingerprint identification unit 301 provided in an embodiment of the present disclosure.

As shown in FIG. 9, in a fingerprint identification unit 301, the microlens 310 corresponds to a 4×4 pixel unit array. In the 4×4 pixel unit array, 2×2 pixel units located at the center are the first pixel units 331, and 4 pixel units located at four corners are 4 of the second pixel units 332. In addition, except for the 2×2 first pixel units 331 and the 4 second pixel units 332, other 8 pixel units are 8 of the third pixel units 333.

Figure 10:
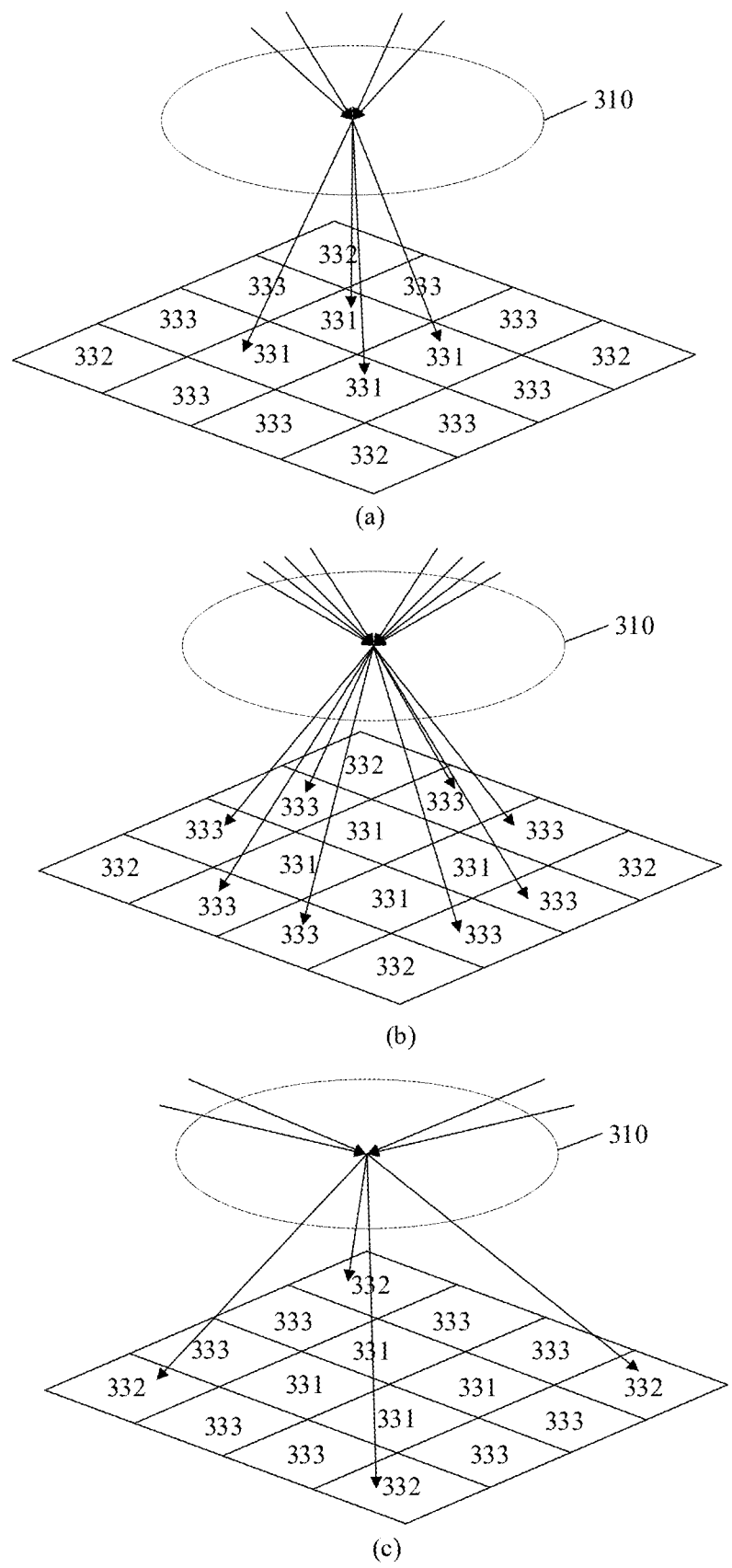
FIG. 10 is a schematic diagram of light paths of different pixel units in a 4×4 pixel unit array in the embodiment shown in FIG. 9.

FIG. 10 shows a schematic diagram of light paths of different pixel units in the 4×4 pixel unit array in the embodiment shown in FIG. 9. For ease of illustration, at least two light blocking layers 320 are omitted in FIG. 10.

Referring to FIGS. 10(a)-(c), the light collection angles of the first pixel unit 331, the second pixel unit 332, and the third pixel unit 333 are all larger than 0° and smaller than 90°, the light collection angle of the third pixel unit 333 is smaller than the light collection angle of the second pixel unit 332, and the light collection angle of the first pixel unit 331 is smaller than the light collection angle of the third pixel unit 333.

Through the technical solutions of the two embodiments mentioned above, in a fingerprint identification unit 301, the microlens 310 may correspond to a 3×3 pixel unit array or a 4×4 pixel unit array, and pixel units at different positions in the pixel unit array may have different light collection angles, thus facilitating the technical implementations of the apparatus 300 for identifying a fingerprint having both a large light collection angle and a small light collection angle in the present disclosure.

Particularly, in the technical solution where the microlens 310 corresponds to the 3×3 pixel unit array, the light collection angle of the first pixel unit 331 is 0°, and there is little stray light in the first fingerprint light signal that can be received by the first pixel unit 331. The first fingerprint light signal carries a large amount of signals, and therefore has better imaging performance and can be adapted to many application scenarios.

In addition, in related technologies, each pixel unit in the pixel unit array corresponds to a small microlens. For example, a 3×3 pixel unit array corresponds to 3×3 microlenses. In the technical solution of the embodiment of the present disclosure, a large microlens corresponds to a pixel unit array composed of a plurality of pixel units. An area of a large microlens corresponding to the 3×3 pixel unit array may be larger than a sum of areas of the 3×3 microlenses. Therefore, in the embodiment of the present disclosure, the large microlens provided in the fingerprint identification unit 301 may have a large incident light amount. The large incident light amount means that the same incident light amount can be achieved with a smaller field angle. The smaller field angle means that a single pixel unit can have a smaller identification region, making it receive a stronger signal amount, thereby improving the fingerprint imaging quality of the apparatus 300 for identifying a fingerprint. Alternatively, more incident light amount can be obtained under the same field angle, thereby mitigating the impacts caused by fluctuations of external light sources, and improving the signal-to-noise ratio of the fingerprint image formed by the apparatus 300 for identifying a fingerprint.

Further referring to FIGS. 7 and 9, in a fingerprint identification unit 301, the number of light-passing apertures is equal to the number of pixel units in each light blocking layer among the at least two light blocking layers 320. light-passing apertures with one-to-one correspondence to a plurality of pixel units are formed in each light blocking layer, and light-passing apertures corresponding to a same pixel unit in the at least two light blocking layers 320 form a light guiding channel corresponding to the pixel unit.

It can be understood that, except for the underlying light blocking layer 321, light-passing apertures in other light blocking layers among the at least two light blocking layers 320 may be connected to each other. For example, all light-passing apertures in a non-underlying light blocking layer 322 are connected to each other to form a large light-passing aperture. For another example, some light-passing apertures in the non-underlying light blocking layer 322 are connected to each other, and the number of light-passing apertures in the non-underlying light blocking layer 322 is smaller than the number of pixel units in the fingerprint identification unit 301.

It can be further understood that FIGS. 7 and 9 are only for illustration, showing schematic structural diagrams of two fingerprint identification units 301 provided in embodiments of the present disclosure. In addition to the technical solutions shown in FIGS. 7 and 9, in other alternative embodiments, a microlens 310 in the fingerprint identification unit 301 may also correspond to other numbers of multiple pixel units. Specifically, a plurality of pixel units in a fingerprint identification unit 301 may be an N×N pixel unit array, where N is any positive integer greater than 2.

When N is greater than 4, the design and manufacture of the fingerprint identification unit 301 will become complex, and too many light-passing apertures are provided in the light blocking layer 320, which easily causes impact of crosstalk of light signals between different pixel units on the fingerprint imaging quality. Therefore, based on comprehensive consideration, the two technical solutions with N=3 or 4 shown in FIGS. 7 and 9 can balance the application requirements and the design and manufacture costs of the apparatus 300 for identifying a fingerprint, thus have high practicability, and are more easily promoted and used in products.

Figure 11:
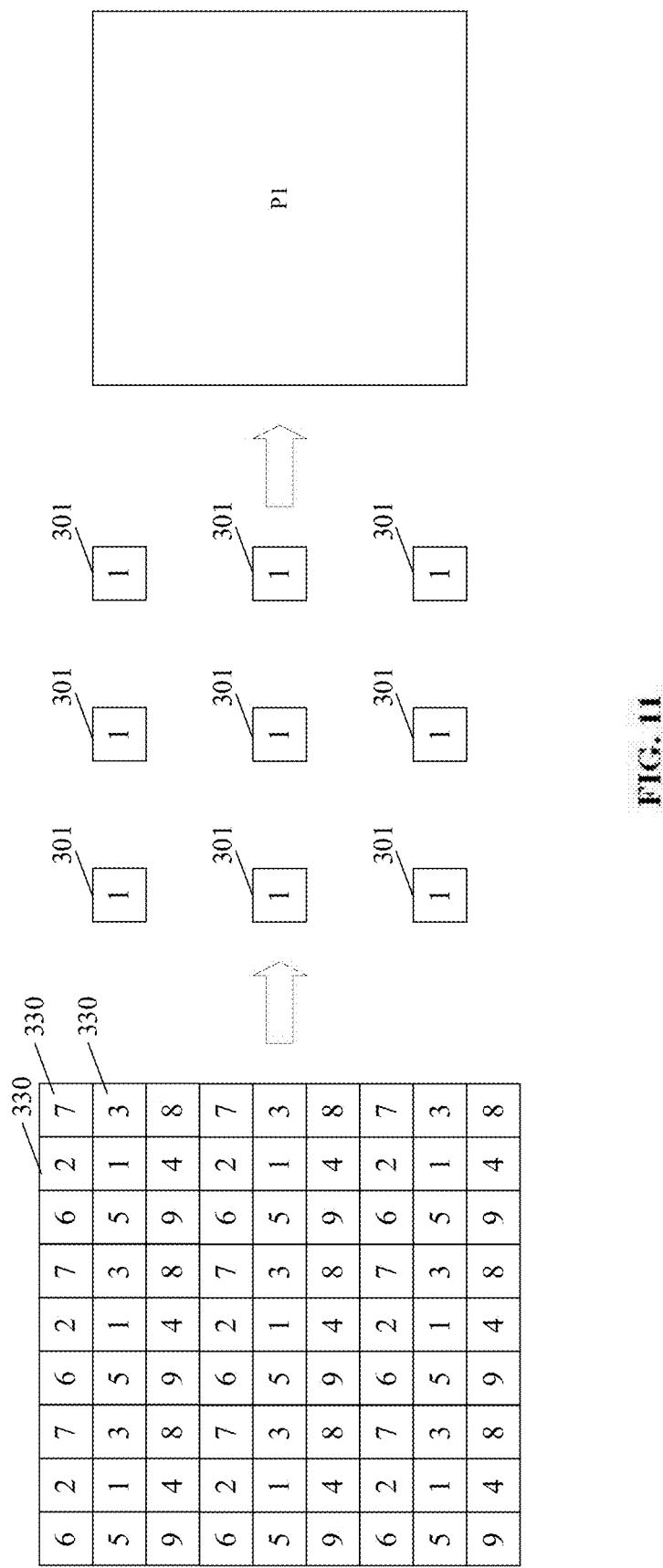
FIG. 11 is a schematic diagram of a pixel unit array for fingerprint identification in an apparatus for identifying a fingerprint provided in an embodiment of the present disclosure.

Taking the fingerprint identification unit 301 shown in FIG. 7 as an example, the apparatus 300 for identifying a fingerprint may include a fingerprint identification unit array formed by a plurality of fingerprint identification units 301. Therefore, the apparatus 300 for identifying a fingerprint may include a plurality of 3×3 pixel unit arrays, to form a large pixel unit array for fingerprint identification. FIG. 11 shows a schematic diagram of a pixel unit array for fingerprint identification in the apparatus 300 for identifying a fingerprint.

As shown in FIG. 11, a pixel unit array for fingerprint identification formed by 3×3 fingerprint identification units 301 is shown as an example. The pixel unit array for fingerprint identification includes 9×9 pixel units 330. Among the 9×9 pixel units 330, equally numbered pixel units 330 are configured to receive fingerprint light signals in a same direction.

For example, the pixel unit 330 numbered "1" in the figure may be the first pixel unit 331 in the above embodiments, and all of the first pixel units 331 in the pixel unit array for fingerprint identification are configured to receive first fingerprint light signals in a same direction and can be used to form a first fingerprint image P1. Similarly, in the figure, pixel units 330 numbered "2," "3," "4," and "5" may be the third pixel units 333 in the above embodiments; the 4 third pixel units 333 may receive third fingerprint light signals in different directions but in the same angle respectively; equally numbered third pixel units 333 may receive third fingerprint light signals in the same direction and form a third fingerprint image; and non-equally numbered third pixel units 333 may receive third fingerprint light signals in different directions to form a plurality of third fingerprint images. Therefore, the apparatus 300 for identifying a fingerprint can form 4 third fingerprint images. In the figure, pixel units 330 numbered "6," "7," "8," and "9" may be the second pixel units 332 in the above embodiments; the 4 second pixel units 332 may receive second fingerprint light signals in different directions but in the same angle respectively; equally numbered second pixel units 333 may receive second fingerprint light signals in the same direction and form a second fingerprint image; and non-equally numbered second pixel units 332 may receive second fingerprint light signals in different directions to form a plurality of second fingerprint images. Therefore, the apparatus 300 for identifying a fingerprint can form 4 second fingerprint images.

To sum up, the fingerprint identification unit array of the apparatus 300 for identifying a fingerprint shown in FIG. 11 may form 9 fingerprint images. The 9 fingerprint images may be separately used for fingerprint identification, or some fingerprint images among the 9 fingerprint images may be fused with each other to form a fused fingerprint image for fingerprint identification, for example, at least some of the 4 second fingerprint images may be fused with each other to form a fused second fingerprint image, and at least some of the 4 third fingerprint images may be fused with each other to form a fused third fingerprint image.

In the above embodiments, the position of the light-passing aperture in the light guiding channel 302 and located in the underlying light blocking layer 321 is constrained mainly based on the ratio of the distance from the center of the light-passing aperture in the light guiding channel 302 and located in the underlying light blocking layer 321 to the center of the projection of the microlens 310 on the underlying light blocking layer 321 to the arrangement period of the plurality of pixel units 330, thereby designing the angle and direction of the light guiding channel 302. On this basis, other parameters in the fingerprint identification unit 301 may be further constrained and designed, to further optimize the optical imaging performance of the fingerprint identification unit 301 and the apparatus 300 for identifying a fingerprint.

Optionally, in some embodiments, a position of a light-passing aperture in the first light guiding channel and located in a non-underlying light blocking layer among the at least two light blocking layers 3021 satisfies $0 \leq S_{21}/P_a \leq 1.2$, and a position of a light-passing aperture in the second light guiding channel and located in a non-underlying light blocking layer 3022 satisfies $0.5 \leq S_{22}/P_a \leq 2.5$, where $S_{21}$ is a distance from a center of the light-passing aperture in the first light guiding channel and located in the non-underlying light blocking layer 3021 to a center of projection of the microlens 310 on the non-underlying light blocking layer, and $S_{22}$ is a distance from a center of the light-passing aperture in the second light guiding channel and located in a non-underlying light blocking layer 3022 to the center of the projection of the microlens 310 on the non-underlying light blocking layer.

Further, when the fingerprint identification unit 301 includes the third light guiding channel, the position of the light-passing aperture in the third light guiding channel and located in the non-underlying light blocking layer satisfies $0.4 \leq S_{23}/P_a \leq 1.8$, where $S_{23}$ is the distance from the center of the light-passing aperture in the third light guiding channel and located in the non-underlying light blocking layer to the center of the projection of the microlens 310 on the non-underlying light blocking layer.

Optionally, in some embodiments, the positions of the light-passing apertures located in the non-underlying light blocking layer of the first light guiding channel, the second light guiding channel, and the third light guiding channel can satisfy $S_{21}/P_a < S_{23}/P_a < S_{22}/P_a$.

In the embodiments shown above, the fingerprint identification unit 301 may only include two light blocking layers 320. In this case, a position of a light-passing aperture in a top light blocking layer among the two light blocking layers 320 can satisfy the above-mentioned position restrictions of the light-passing aperture in the non-underlying light blocking layer. In some other embodiments, the fingerprint identification unit 301 may include three or more than three light blocking layers 320. In this case, a position of a light-passing aperture in any one non-underlying light blocking layer among the three or more than three light blocking layers 320 except for the underlying light blocking layer 321 can satisfy the above-mentioned position restrictions of the light-passing aperture in the non-underlying light blocking layer. In the present disclosure, the non-underlying light blocking layer refers to any one light blocking layer among the at least two light blocking layers 320 except for the underlying light blocking layer 321, and may be the top light blocking layer or may be an intermediate light blocking layer.

Figure 12:
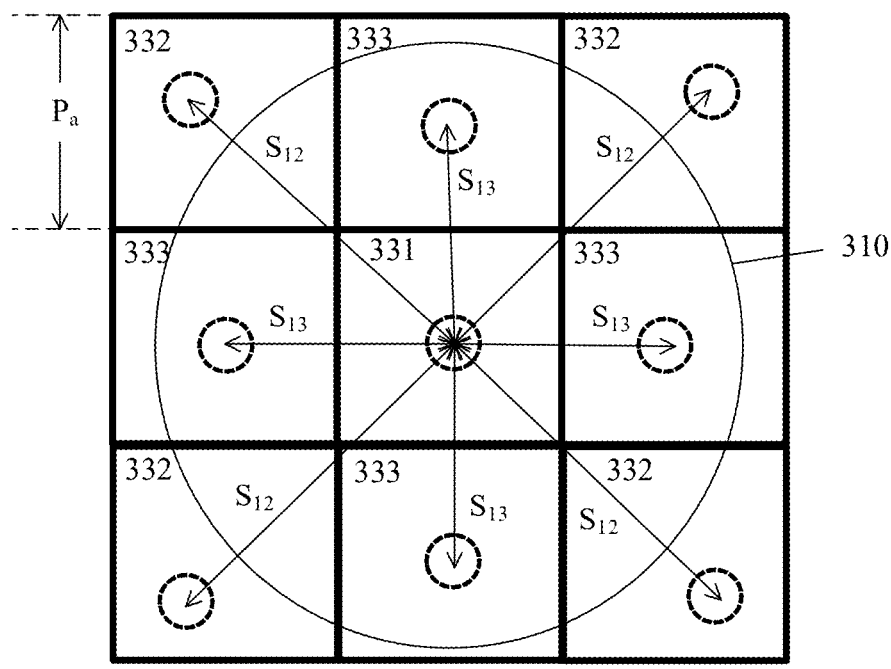
FIG. 12 is two schematic top views of the embodiment shown in FIG. 7.
Figure 12:
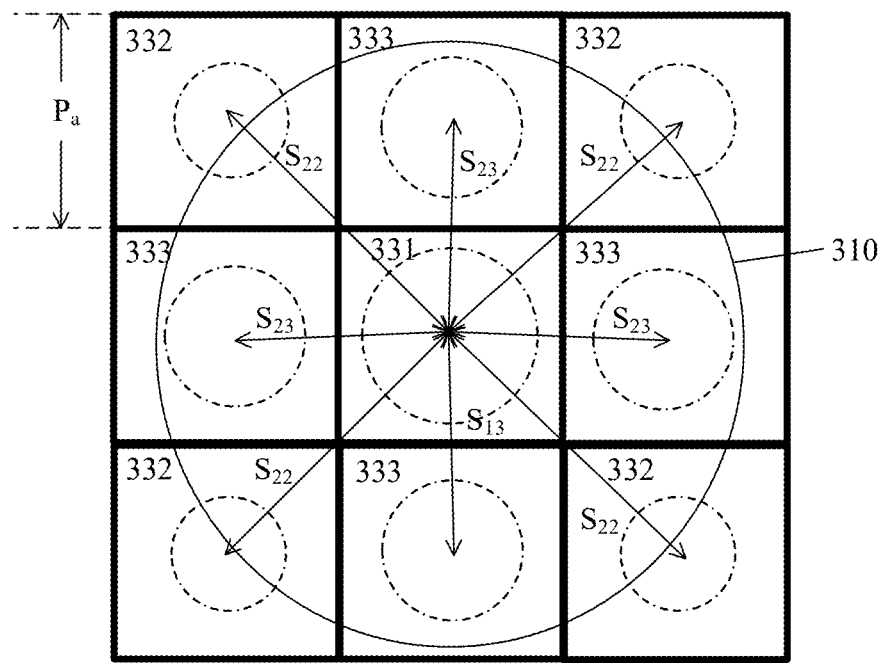

Taking the embodiment shown in FIG. 7 as an example, FIG. 12 shows two schematic top views of the embodiment shown in FIG. 7. For ease of illustration, FIG. 12(a) omits the non-underlying light blocking layer 322, and only shows the light-passing aperture in the underlying light blocking layer 321; and FIG. 12(b) omits the underlying light blocking layer 321, and only shows the light-passing aperture in the non-underlying light blocking layer 322.

As shown in FIG. 12(a), in the underlying light blocking layer 321, the center of the light-passing aperture corresponding to the first pixel unit 331 and the center of the microlens 310 coincide with each other in the first direction. Therefore, the distance $S_{11}$ from the center of the light-passing aperture in the first light guiding channel 3021 and located in the underlying light blocking layer 321 to the center of the projection of the microlens 310 on the underlying light blocking layer 321 is 0. Therefore, Su is not shown in FIG. 12(a). It can be understood that, in addition to 0, $S_{11}$ may also be other values to satisfy the restrictions of $0 \leq S_{11}/P_a \leq 1.4$.

In addition, the distance from the center of the light-passing aperture corresponding to the second pixel unit 332 in the underlying light blocking layer 321, that is, the light-passing aperture in the second light guiding channel 3022 and located in the underlying light blocking layer 321 to the center of the projection of the microlens 310 on the underlying light blocking layer 321 is annotated as $S_{12}$. The distance from the center of the light-passing aperture corresponding to the third pixel unit 333, that is, the light-passing aperture in the third light guiding channel and located in the underlying light blocking layer 321 to the center of the projection of the microlens 310 on the underlying light blocking layer 321 is annotated as $S_{13}$. As mentioned in the above embodiments, $S_{12}$ and $S_{13}$ can satisfy restrictions of $0.7 \leq S_{12}/P_a \leq 2.8$ and $0.5 \leq S_{13}/P_a \leq 2.2$.

As shown in FIG. 12(b), the center of the light-passing aperture corresponding to the first pixel unit 331 in the non-underlying light blocking layer 322 and the center of the microlens 310 coincide with each other in the first direction. Therefore, the distance $S_{21}$ from the center of the light-passing aperture in the first light guiding channel 3021 and located in the non-underlying light blocking layer 322 to the center of the projection of the microlens 310 on the non-underlying light blocking layer 322 is 0. Therefore, $S_{21}$ is not shown in FIG. 12(b). It can be understood that, in addition to 0, $S_{21}$ may also be other values to satisfy the restrictions of $0 \leq S_{21}/P_a \leq 1.2$.

In addition, the distance from the center of the light-passing aperture corresponding to the second pixel unit 332 in the non-underlying light blocking layer 322, that is, the light-passing aperture in the second light guiding channel 3022 and located in the non-underlying light blocking layer 322 to the center of the projection of the microlens 310 on the non-underlying light blocking layer 322 is annotated as $S_{22}$. The distance from the center of the light-passing aperture corresponding to the third pixel unit 333, that is, the light-passing aperture in the third light guiding channel and located in the non-underlying light blocking layer 322 to the center of the projection of the microlens 310 on the non-underlying light blocking layer 322 is annotated as $S_{23}$. The $S_{22}$ and $S_{23}$ can satisfy the restrictions of $0.5 \leq S_{22}/P_a \leq 2.5$ and $0.4 \leq S_{23}/P_a \leq 1.8$.

Through the technical solution of the embodiment of the present disclosure, for the design of each light guiding channel 302 in the fingerprint identification unit 301, not only is the ratio of the distance from the center of the light-passing aperture in the underlying light blocking layer 321 to the center of the projection of the microlens 310 on the underlying light blocking layer 321 to the arrangement period of the plurality of pixel units 330 considered, but also a ratio of the distance from the center of the light-passing aperture in the non-underlying light blocking layer 322 to the center of the projection of the microlens 310 on the non-underlying light blocking layer 322 to the arrangement period of the plurality of pixel units 330 is considered. This technical solution can relatively accurately characterize the relative positional relationship between the light-passing apertures in the underlying light blocking layer 321 and the non-underlying light blocking layer 322 and the pixel units 330, so that the light guiding channel 302 has better light guiding performance for the corresponding pixel unit 330, and the fingerprint light signal can be transmitted to the corresponding pixel unit 330 accurately through the light-passing apertures in the light guiding channel 302 and located in the underlying light blocking layer 321 and the non-underlying light blocking layer 322, to achieve effective fingerprint imaging with better quality.

Figure 13:
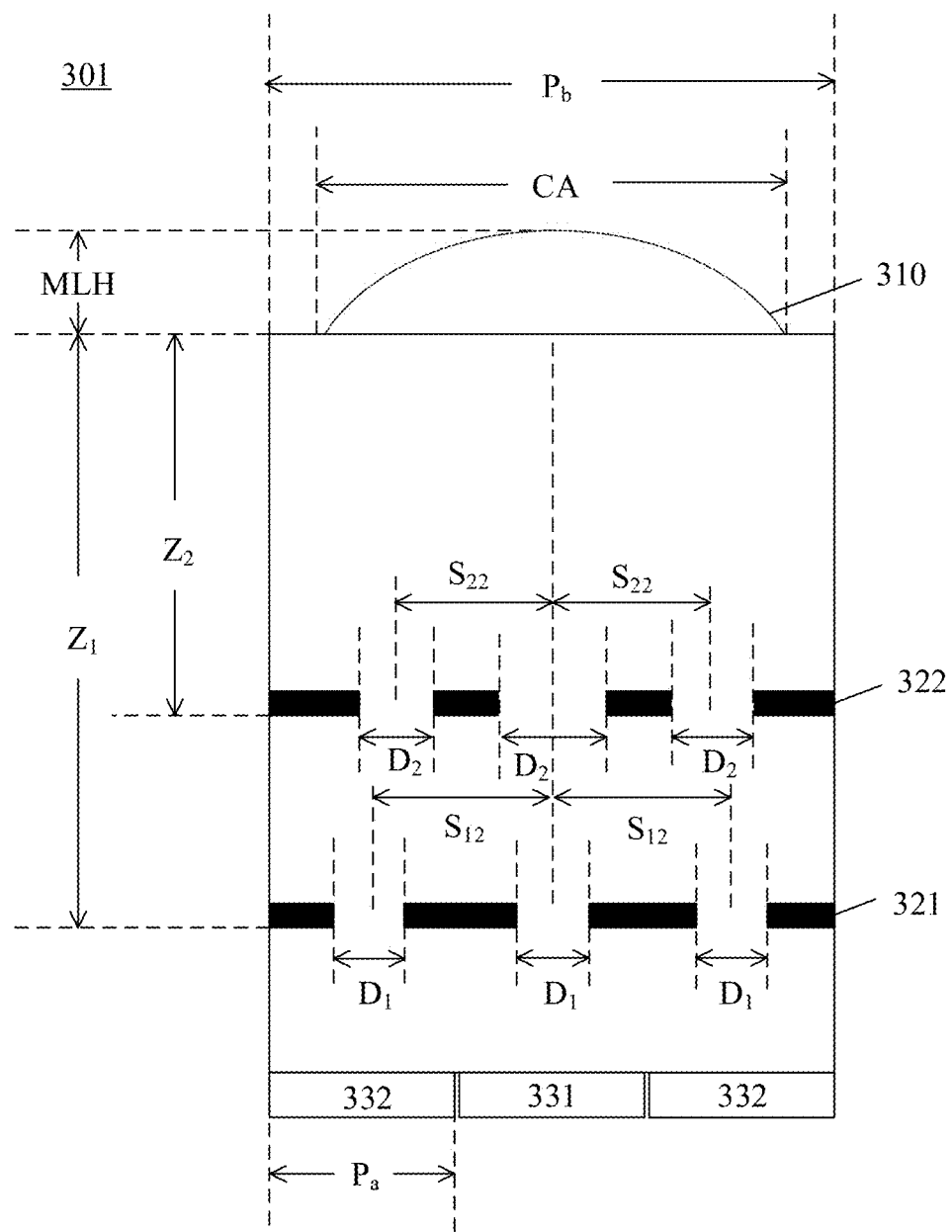
FIG. 13 is a schematic sectional view of the embodiment shown in FIG. 7.

FIG. 13 shows a schematic sectional view of the embodiment shown in FIG. 7.

Optionally, as shown in FIGS. 12 and 13, in the embodiment of the present disclosure, the positions of the light-passing apertures in the first light guiding channel 3021 and located in the underlying light blocking layer 321 and the non-underlying light blocking layer 322 among the at least two light blocking layers satisfy $0 \leq (S_{11}-S_{21})/(Z_1-Z_2) \leq 0.35$, and the positions of the light-passing apertures in the second light guiding channel 3022 and located in the underlying light blocking layer 321 and the non-underlying light blocking layer 322 satisfy $0.25 \leq (S_{12}-S_{22})/(Z_1-Z_2) \leq 0.8$; where $Z_1$ is a depth distance between a lower surface of the underlying light blocking layer 321 and a lower surface of the microlens 310, and $Z_2$ is a depth distance between a lower surface of the non-underlying light blocking layer 322 and the lower surface of the microlens 310.

Further, when the fingerprint identification unit 301 includes the third light guiding channel, the positions of the light-passing apertures in the third light guiding channel and located in the underlying light blocking layer 321 and the non-underlying light blocking layer 322 satisfy $0.2 \leq (S_{13} - S_{23})/(Z_1 - Z_2) \leq 0.7$.

Optionally, in some embodiments, the positions of the light-passing apertures located in the underlying light blocking layer 321 and the non-underlying light blocking layer 322 among the at least two light blocking layers of the first light guiding channel, the second light guiding channel, and the third light guiding channel satisfy $(S_{12} - S_{22})/(Z_1 - Z_2) > (S_{13} - S_{23})/(Z_1 - Z_2) > (S_{11} - S_{21})/(Z_1 - Z_2)$.

In the technical solution provided in the embodiment of the present disclosure, by designing the values of $(S_{11} - S_{21})/(Z_1 - Z_2)$, $(S_{12} - S_{22})/(Z_1 - Z_2)$, and $(S_{13} - S_{23})/(Z_1 - Z_2)$, the relative positional relationship between the light-passing apertures in the plurality of light guiding channels 302 and located in the underlying light blocking layer 321 and the light-passing apertures in the plurality of light guiding channels and located in the non-underlying light blocking layer 322 can be designed, and then light guiding directions and angles of the plurality of light guiding channels 302 can be designed. The value of $(S_{11} - S_{21})/(Z_1 - Z_2)$ can be used to characterize the angle of the first light guiding channel 3021, the value of $(S_{12} - S_{22})/(Z_1 - Z_2)$ can be used to characterize the angle of the second light guiding channel 3022, and the value of $(S_{13} - S_{23})/(Z_1 - Z_2)$ can be used to characterize the angle of the third light guiding channel. Therefore, through the technical solution of the embodiment of the present disclosure, pixel units 330 corresponding to the plurality of light guiding channels 302 can receive a fingerprint light signal in a preset design angle, to achieve better fingerprint imaging effects and fingerprint identification performance.

In addition to the above-mentioned constraints, optionally, in some embodiments, a position of a light-passing aperture in each light guiding channel among the plurality of light guiding channels 302 and located in the underlying light blocking layer 321 further satisfies $0 \leq S_1/Z_1 \leq 0.6$, where $S_1$ is a distance from a center of the light-passing aperture in each light guiding channel and located in the underlying light blocking layer 321 to a center of projection of the microlens 310 on the underlying light blocking layer 321. Specifically, as shown in FIGS. 12 and 13, the position of the light-passing aperture in the first light guiding channel 3021 and located in the underlying light blocking layer 321 can satisfy $0 \leq S_{11}/Z_1 \leq 0.6$, and/or, the position of the light-passing aperture in the second light guiding channel 3022 and located in the underlying light blocking layer 321 can satisfy $0 \leq S_{12}/Z_1 \leq 0.6$, and/or, the position of the light-passing aperture in the third light guiding channel and located in the underlying light blocking layer 321 can satisfy $0 \leq S_{13}/Z_1 \leq 0.6$.

In the technical solution of this embodiment, the positions of the plurality of light-passing apertures in the underlying light blocking layer 321 can be further constrained based on the depth distance between the lower surface of the underlying light blocking layer 321 and the lower surface of the microlens 310 and the distance from the center of each light-passing aperture in the light guiding channel 302 and located in the underlying light blocking layer 321 to the center of the projection of the microlens 310 on the underlying light blocking layer 321, thereby further optimizing the light guiding performance of the light guiding channel 302, that is, allowing fingerprint light signals in a target direction to pass through, while blocking fingerprint light signals in non-target directions, and reducing the impact of stray light on imaging.

Further referring to FIG. 13, optionally, a radius of curvature (ROC) of the microlens 310 and the depth distance $Z_1$ between the lower surface of the underlying light blocking layer 321 and the lower surface of the microlens 310 satisfy $0.3 \leq ROC/Z_1 \leq 0.6$.

Specifically, in the embodiment of the present disclosure, if the microlens 310 is a spherical lens, the radius of curvature (ROC) of the microlens 310 can be computed via the following formula:

$$ROC = \frac{CA^2}{8 \times MLH} + \frac{1}{2} \times MLH.$$

MLH is a height of the microlens 310, that is, a height from a vertex of the microlens 310 to its lower surface, and CA is a maximum caliber of the microlens 310.

Of course, a radius of curvature of an aspheric lens also has its computing mode. A computing method in related technologies may be referred to for a specific computing method, which is not specifically discussed here.

When the fingerprint light signal converged via the microlens 310 is focused to a vicinity of each light-passing aperture in the underlying light blocking layer 321 or to each light-passing aperture in the underlying light blocking layer 321, the apparatus 300 for identifying a fingerprint has optimal imaging effects, to improve the image contrast while balancing the fingerprint image brightness. In the technical solution of this embodiment, the radius of curvature (ROC) of the microlens 310 and the depth distance $Z_1$ between the lower surface of the underlying light blocking layer 321 and the lower surface of the microlens 310 are constrained to satisfy $0.3 \leq ROC/Z_1 \leq 0.6$, and the proportional relationship between the focus of the microlens 310 and the position of the underlying light blocking layer 321 is comprehensively considered, so that the microlens 310 focuses the fingerprint light signal to a vicinity of each light-passing aperture in the underlying light blocking layer 321 or to each light-passing aperture in the underlying light blocking layer 321, thereby improving the fingerprint image quality and the identification performance of the apparatus 300 for identifying a fingerprint.

Based on the above embodiments of the present disclosure, the radius of curvature (ROC) of the microlens 310 and the depth distance $Z_1$ between the lower surface of the underlying light blocking layer 321 and the lower surface of the microlens 310 can further satisfy $0.4 \leq ROC/Z_1 \leq 0.55$. Through the technical solution of this embodiment, the position of each light-passing aperture in the underlying light blocking layer 321 can be further constrained, so that the fingerprint light signal can be more accurately converged and transmitted to each light-passing aperture in the underlying light blocking layer 321, thereby further improving the image quality.

Further referring to FIG. 13, in some embodiments, the depth distance $Z_2$ between the lower surface of the non-underlying light blocking layer 322 and the lower surface of the microlens 310 and the depth distance $Z_1$ between the lower surface of the underlying light blocking layer 321 and the lower surface of the microlens 310 satisfy $0.1 \leq Z_2/Z_1 \leq 0.9$.

Through the technical solution of this embodiment, the relative positional relationship between each of the non-underlying light blocking layer 322 and the underlying light blocking layer 321 among the at least two light blocking layers and the microlens 310 can be designed, so that the non-underlying light blocking layer 322 and the underlying light blocking layer 321 cooperate with each other to form a light guiding channel with good light guiding performance. When $Z_2/Z_1 \geq 0.1$, it can prevent the distance between the non-underlying light blocking layer 322 and the lower surface of the microlens 310 from being too small, thereby affecting the signal amount of the fingerprint light signal received by the light-passing aperture in the non-underlying light blocking layer 322. When $Z_2/Z_1 \leq 0.9$, it can prevent the distance between the non-underlying light blocking layer 322 and the underlying light blocking layer 321 from being too small, thereby affecting the length of the light guiding channel 302 formed by the at least two light blocking layers 321, to affect the direction guiding effects of the light guiding channel 302 on the fingerprint light signal.

Based on the above embodiments of the present disclosure, the depth distance $Z_2$ between the lower surface of the non-underlying light blocking layer 322 and the lower surface of the microlens 310 and the depth distance $Z_1$ between the lower surface of the underlying light blocking layer 321 and the lower surface of the microlens 310 can further satisfy $0.5 \leq Z_2/Z_1 \leq 0.9$.

Through the technical solution of this embodiment, $Z_2/Z_1$ is adjusted and optimized to be greater than or equal to 0.5, which can further ensure that there is an enough distance between the non-underlying light blocking layer 322 and the lower surface of the microlens 310, thereby ensuring that the light-passing aperture in the non-underlying light blocking layer 322 receives enough fingerprint light signals to ensure the fingerprint imaging performance of the apparatus 300 for identifying a fingerprint.

Figure 14:
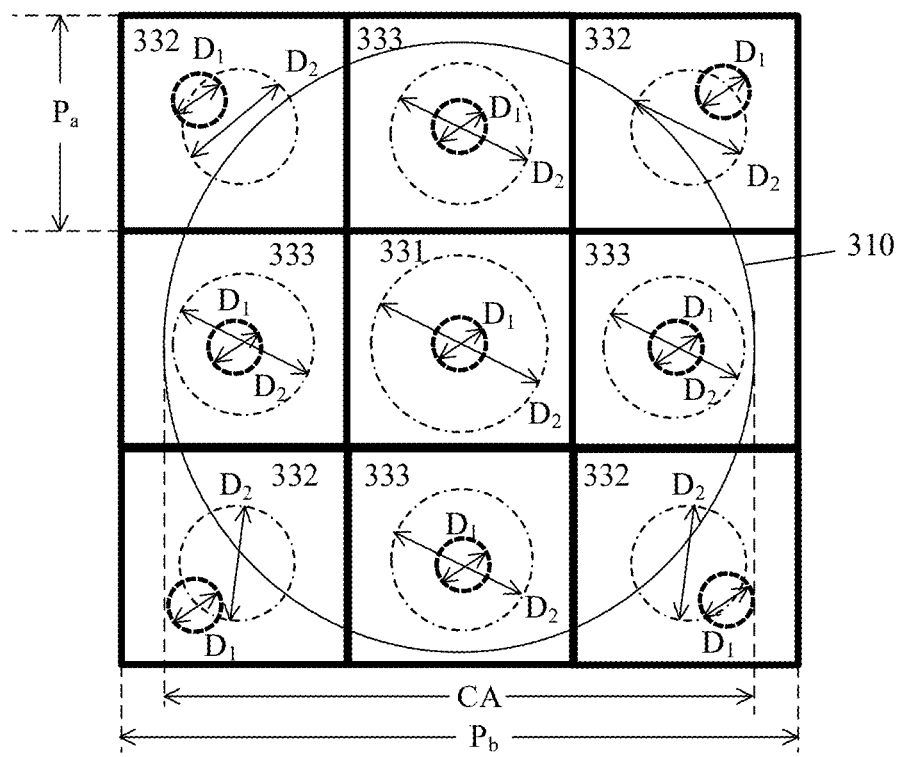
FIG. 14 is another schematic top view of the embodiment shown in FIG. 7.

FIG. 14 shows another schematic top view of the fingerprint identification unit 301 shown in FIG. 7.

As shown in FIGS. 13 and 14, in the fingerprint identification unit 301, a maximum diameter of the light-passing aperture located in the underlying light blocking layer 321 is annotated as $D_1$. In some embodiments, a plurality of light-passing apertures in the underlying light blocking layer 321 are circular holes, and $D_1$ represents a diameter of one of the light-passing apertures. In some other embodiments, the plurality of light-passing apertures in the underlying light blocking layer 321 may also be rounded rectangular holes, and $D_1$ represents a distance between opposite angles of the light-passing aperture.

Optionally, the maximum diameter $D_1$ of the light-passing aperture in the underlying light blocking layer 321 and the maximum caliber (CA) of the microlens 310 satisfy $0.005 \leq D_1/CA \leq 0.2$.

Specifically, the maximum caliber (CA) of the microlens 310 may be a maximum width of the microlens 310 in a largest section along a second direction, where the second direction is perpendicular to the above-mentioned first direction, that is, the second direction is parallel to the plane where the plurality of pixel units are located.

Optionally, the microlens 310 may be a spherical lens or an aspherical lens with its upper surface being a spherical surface or an aspherical surface, and tis lower surface being a horizontal surface. The maximum caliber (CA) of the microlens 310 may be a maximum width of its lower surface. For example, in the embodiments shown in FIGS. 13 and 14, the microlens 310 may be a spherical lens with its lower surface being a circular surface, and the maximum caliber (CA) of the microlens 310 is the diameter of the circular surface.

Through the technical solution of the embodiment of the present disclosure, the maximum diameter $D_1$ of each light-passing aperture in the underlying light blocking layer 321 and the maximum caliber (CA) of the microlens 310 are constrained to satisfy $D_1/CA \leq 0.2$, and a proportional relationship between a light passing area of the microlens 310 and a size of the light-passing aperture in the underlying light blocking layer 321 can be comprehensively considered. When the proportional relationship is less than or equal to 0.2, each light-passing aperture in the underlying light blocking layer 321 below the current microlens 310 can favorably shield stray light transmitted through adjacent microlenses 310, and reduce image aliasing, thereby improving the imaging contrast, or in other words, improving the image contrast, and improving the fingerprint image quality. In addition, in the embodiment of the present disclosure, $D_1/CA \geq 0.005$ is further constrained, thereby ensuring that enough light signals can pass through each light-passing aperture in the underlying light blocking layer 321 to ensure the imaging brightness. Therefore, the image brightness and image contrast can be balanced using the solution of the embodiment of the present disclosure, thereby improving the image quality and the identification success rate.

Based on the above embodiments of the present disclosure, the maximum diameter D1 of the light-passing aperture in the underlying light blocking layer 321 and the maximum caliber (CA) of the microlens 310 can further satisfy $0.05 \leq D_1/CA \leq 0.1$.

Through the technical solution of this embodiment, the contrast and brightness of the fingerprint imaging of the apparatus 300 for identifying a fingerprint can be further optimized, thereby further improving the fingerprint image quality and the identification success rate.

As shown in FIGS. 13 and 14, in the fingerprint identification unit 301, a maximum diameter of the light-passing aperture located in the non-underlying light blocking layer 322 is annotated as $D_2$. Optionally, in some embodiments, the maximum diameter $D_2$ of the light-passing aperture in the non-underlying light blocking layer 322 and the maximum caliber (CA) of the microlens 310 can satisfy $0.05 \leq D_2/CA \leq 0.5$.

Through the technical solution of the embodiment of the present disclosure, the proportional relationship between the light passing area of the microlens 310 and a size of the light-passing aperture in the non-underlying light blocking layer 322 can be further comprehensively considered, so that the light-passing apertures in the non-underlying light blocking layer 322 and the underlying light blocking layer 321 can cooperate with each other, thereby reducing stray light through the light-passing apertures, and further improving the imaging contrast and brightness, to improve the fingerprint image quality.

Based on the above embodiments of the present disclosure, the maximum diameter $D_2$ of the light-passing aperture in the non-underlying light blocking layer 322 and the maximum caliber (CA) of the microlens 310 can further satisfy $0.08 \leq D_2/CA \leq 0.3$.

Through the technical solution of this embodiment, $D_2/CA$ adjusted to be less than or equal to 0.3 and $D_2/CA$ is adjusted to be less than or equal to 0.08, to further optimize the fingerprint image quality of the apparatus 300 for identifying a fingerprint to improve the fingerprint identification performance.

Optionally, as shown in FIGS. 13 and 14, $P_b$ is the arrangement period of the microlenses 310 in the apparatus 300 for identifying a fingerprint, and $P_a$ is the arrangement period of the pixel units 330 in the apparatus 300 for identifying a fingerprint. For example, after the plurality of fingerprint identification units 301 are arranged in an array, the plurality of microlenses 310 form a microlens array, and the plurality of pixel units 330 form a pixel array. On a horizontal plane, an arrangement period of the plurality of microlenses 310 is $P_b$ in either of the X direction and the Y direction, and an arrangement period of the plurality of pixel units 330 is $P_b$ in either of the X direction and the Y direction. In the present disclosure, the horizontal plane is parallel to a plane where a display screen is located, a vertical plane is perpendicular to the plane where the display screen is located, and the plane where the plurality of pixel units 330 are located is the horizontal plane.

Comprehensively considering the image space sampling rate and process costs, in some implementations, 5 µm≤$P_b$≤100 µm, and further, 20 µm≤$P_b$≤80 µm.

Optionally, in the embodiment of the present disclosure, $P_b/P_a$ can be constrained to be less than or equal to 3, to ensure the imaging performance of each fingerprint identification unit 301 in the apparatus 300 for identifying a fingerprint. It can be understood that when $P_b/P_a$=N, in a fingerprint identification unit 301, a microlens 310 may correspond to N×N pixel units 330, where N is any positive integer greater than or equal to 3.

In some embodiments, 3≤$P_b/P_a$≤4, for example, in a fingerprint identification unit 301, a microlens 310 corresponds to 3×3 pixel units 330 or 4×4 pixel units 330. In this case, the fingerprint identification performance and the overall design costs of the fingerprint identification unit 301 can be balanced, so that the fingerprint identification unit 301 has better comprehensive performance, which is beneficial to the promotion and use of the apparatus 300 for identifying a fingerprint where the fingerprint identification unit 301 is located.

As a specific example, when $P_b/P_a$=3, for example, in a fingerprint identification unit 301, a microlens 310 corresponds to 3×3 pixel units 330. In this case, the fingerprint identification unit 301 can satisfy at least one of the following constraints.

(1) The position of the light-passing aperture in the first light guiding channel and located in the underlying light blocking layer 321 among the at least two light blocking layers satisfies 0≤$S_{11}/P_a$≤0.7.

(2) The position of the light-passing aperture in the second light guiding channel and located in the underlying light blocking layer 321 satisfies 0.7≤$S_{12}/P_a$≤2.1.

(3) The position of the light-passing aperture in the third light guiding channel and located in the underlying light blocking layer 321 satisfies 0.5≤$S_{13}/P_a$≤1.5.

(4) The positions of the light-passing apertures located in the underlying light blocking layer 321 of the first light guiding channel, the second light guiding channel, and the third light guiding channel satisfy $S_{11}/P_a$<$S_{13}/P_a$<$S_{12}/P_a$.

(5) The position of the light-passing aperture in the first light guiding channel and located in the non-underlying light blocking layer 322 among the at least two light blocking layers of satisfies 0≤$S_{21}/P_a$≤0.5.

(6) The position of the light-passing aperture in the second light guiding channel and located in the non-underlying light blocking layer 322 satisfies 0.5≤$S_{22}/P_a$≤1.9.

(7) The position of the light-passing aperture in the third light guiding channel and located in the non-underlying light blocking layer 322 satisfies 0.4≤$S_{23}/P_a$≤1.3.

(8) The positions of the light-passing apertures located in the non-underlying light blocking layer 322 of the first light guiding channel, the second light guiding channel, and the third light guiding channel satisfy $S_{21}/P_a$<$S_{23}/P_a$<$S_{22}/P_a$.

(9) The positions of the light-passing apertures in the first light guiding channel and located in the underlying light blocking layer 321 and the non-underlying light blocking layer 322 among the at least two light blocking layers satisfy 0≤$(S_{11}-S_{21})/(Z_1-Z_2)$≤0.35.

(10) The positions of the light-passing apertures in the second light guiding channel and located in the underlying light blocking layer 321 and the non-underlying light blocking layer 322 among the at least two light blocking layers satisfy 0.25≤$(S_{12}-S_{22})/(Z_1-Z_2)$≤0.8.

(11) The positions of the light-passing apertures in the third light guiding channel and located in the underlying light blocking layer 321 and the non-underlying light blocking layer 322 among the at least two light blocking layers satisfy 0.2≤$(S_{13}-S_{23})/(Z_1-Z_2)$≤0.7.

(12) The positions of the light-passing apertures located in the underlying light blocking layer 321 and the non-underlying light blocking layer 322 among the at least two light blocking layers of the first light guiding channel, the second light guiding channel, and the third light guiding channel satisfy $(S_{12}-S_{22})/(Z_1-Z_2)$>$(S_{13}-S_{23})/(Z_1-Z_2)$>$(S_{11}-S_{21})/(Z_1-Z_2)$.

As another specific example, when $P_b/P_a$=4, for example, in a fingerprint identification unit 301, a microlens 310 corresponds to 4×4 pixel units 330. In this case, the fingerprint identification unit 301 can satisfy at least one of the following constraints.

(1) The position of the light-passing aperture in the first light guiding channel and located in the underlying light blocking layer 321 among the at least two light blocking layers satisfies 0≤$S_{11}/P_a$≤1.4.

(2) The position of the light-passing aperture in the second light guiding channel and located in the underlying light blocking layer 321 satisfies 1.4≤$S_{12}/P_a$≤2.8.

(3) The position of the light-passing aperture in the third light guiding channel and located in the underlying light blocking layer 321 satisfies 1≤$S_{13}/P_a$≤2.2.

(4) The positions of the light-passing apertures located in the underlying light blocking layer 321 of the first light guiding channel, the second light guiding channel, and the third light guiding channel satisfy $S_{11}/P_a$<$S_{13}/P_a$<$S_{12}/P_a$.

(5) The position of the light-passing aperture in the first light guiding channel and located in the non-underlying light blocking layer 322 among the at least two light blocking layers satisfies 0≤$S_{21}/P_a$≤1.2.

(6) The position of the light-passing aperture in the second light guiding channel and located in the non-underlying light blocking layer 322 satisfies 1.2≤$S_{22}/P_a$≤2.5.

(7) The position of the light-passing aperture in the third light guiding channel and located in the non-underlying light blocking layer 322 satisfies 0.8≤$S_{23}/P_a$≤1.8.

(8) The positions of the light-passing apertures located in the non-underlying light blocking layer 322 of the first light guiding channel, the second light guiding channel, and the third light guiding channel satisfy $S_{21}/P_a$<$S_{23}/P_a$<$S_{22}/P_a$.

(9) The positions of the light-passing apertures in the first light guiding channel and located in the underlying light blocking layer 321 and the non-underlying light blocking layer 322 among the at least two light blocking layers satisfy 0≤$(S_{11}-S_{21})/(Z_1-Z_2)$≤0.35.

(10) The positions of the light-passing apertures in the second light guiding channel and located in the underlying light blocking layer 321 and the non-underlying light blocking layer 322 among the at least two light blocking layers satisfy $0.25 \leq (S_{12}-S_{22})/(Z_1-Z_2) \leq 0.8$.

(11) The positions of the light-passing apertures in the third light guiding channel and located in the underlying light blocking layer 321 and the non-underlying light blocking layer 322 among the at least two light blocking layers satisfy $0.2 \leq (S_{13}-S_{23})/(Z_1-Z_2) \leq 0.7$.

(12) The positions of the light-passing apertures located in the underlying light blocking layer 321 and the non-underlying light blocking layer 322 among the at least two light blocking layers of the first light guiding channel, the second light guiding channel, and the third light guiding channel satisfy $(S_{12}-S_{22})/(Z_1-Z_2) > (S_{13}-S_{23})/(Z_1-Z_2) > (S_{11}-S_{21})/(Z_1-Z_2)$.

Through the technical solutions of the above two examples, when $P_b/P_a=3$ or 4, for example, in a fingerprint identification unit 301, when a microlens 310 corresponds to 3×3 pixel units 330 or 4×4 pixel units 330, the smaller number of pixel units 330 in the fingerprint identification unit 301 not only is beneficial to saving the manufacturing costs of the fingerprint identification unit 301 and improving the resolution, but also constrains the relative positional relationship between the light-passing apertures in the underlying light blocking layer 321 and the non-underlying light blocking layer 322 of the fingerprint identification unit 301 and the pixel units 330, so that the pixel unit 330 corresponding to the plurality of light guiding channels can receive fingerprint light signals in the preset design angle, to achieve better fingerprint imaging effects and fingerprint identification performance, thereby comprehensively improving the overall performance of the apparatus 300 for identifying a fingerprint.

Table 1 below shows parameter design values of the fingerprint identification unit 301 in several embodiments in the case of $P_b/P_a=3$ or 4 provided in the embodiment of the present disclosure.

TABLE 1

|  | Embodiment 1 | Embodiment 2 | Embodiment 3 | Embodiment 4 |
| --- | --- | --- | --- | --- |
| $P_b/P_a$ | 3 | 3 | 4 | 4 |
| $P^a$ (μm) | 12.5 | 10 | 12.5 | 10 |
| $P^b$ (μm) | 37.5 | 30 | 50 | 40 |
| CA (μm) | 35 | 28 | 45 | 40 |
| MLH (μm) | 10 | 6 | 12 | 10 |
| ROC (μm) | 20.3 | 19.3 | 27.1 | 25 |
| $Z_1$ (μm) | 40 | 45 | 50 | 46 |
| $S_{11}$ (μm) | 0 | 0 | 8 | 7 |
| $S_{12}$ (μm) | 20 | 21 | 25 | 14 |
| $S_{13}$ (μm) | 15 | 14 | 13 | 10.5 |
| $D_{11}$ (μm) | 2.3 | 2.5 | 3.5 | 3.2 |
| $D_{12}$ (μm) | 2.5 | 2.8 | 3.2 | 3 |
| $D_{13}$ (μm) | 2.4 | 2.6 | 3 | 3 |
| $Z_2$ (μm) | 29 | 34 | 42 | 38 |
| $S_{21}$ (μm) | 0 | 0 | 7 | 5.5 |
| $S_{22}$ (μm) | 14 | 16 | 20 | 8 |
| $S_{23}$ (μm) | 10 | 11 | 10 | 7 |
| $D_{21}$ (μm) | 5 | 4.8 | 5 | 4.8 |
| $D_{22}$ (μm) | 5.4 | 4.6 | 4.3 | 4.8 |
| $D_{23}$ (μm) | 4.8 | 4.4 | 4.5 | 4.7 |

Based on the specific parameters shown in Embodiment 1 to Embodiment 4 in the above Table 1, a variety of fingerprint identification units 301 and apparatuses 300 for identifying a fingerprint with better fingerprint identification performance can be realized to adapt to different application requirements.

In addition, it should be noted that in the above Table 1, $D_{11}$ represents a maximum diameter of the light-passing aperture in the first light guiding channel and located in the underlying light blocking layer 321, and $D_{12}$ represents a maximum diameter of the light-passing aperture in the second light guiding channel and located in the underlying light blocking layer 321, and $D_{13}$ represents a maximum diameter of the light-passing aperture in the third light guiding channel and located in the underlying light blocking layer 321. Similarly, $D_{21}$ represents a maximum diameter of the light-passing aperture in the first light guiding channel and located in the non-underlying light blocking layer 322, $D_{22}$ represents a maximum diameter of the light-passing aperture in the second light guiding channel and located in the non-underlying light blocking layer 322, and $D_{23}$ represents a maximum diameter of the light-passing aperture in the third light guiding channel and located in the non-underlying light blocking layer 322.

As shown in Table 1, in the underlying light blocking layer 321 and the non-underlying light blocking layer 322, maximum diameters of light-passing apertures corresponding to different light guiding channels may be different from, or may be equal to, each other. Diameters of light-passing apertures corresponding to different light guiding channels may be designed based on actual requirements, to satisfy the light guiding performance of different light guiding channels and the imaging performance of the corresponding pixel units.

It should be further noted that, in some specific implementations, light-passing apertures of different light guiding channels in a same light blocking layer may be connected to each other to form a macroporus structure. In this case, the maximum diameter of the light-passing aperture referred to in the embodiments of the present disclosure is still the maximum diameter of the light-passing aperture before connection, instead of the maximum diameter of the macropore formed after connection.

In the apparatus 300 for identifying a fingerprint provided in the above embodiments, for each fingerprint identification unit 301, as shown in FIGS. 12 and 14, an orthographic projection of the microlens 310 on the plane where the plurality of pixel units 330 are located is located in a region where the plurality of pixel units 330 are located, in other words, orthographic projections of each pixel unit 330 among the plurality of pixel units 330 and the microlens 310 on the plane where the plurality of pixel units 330 are located are at least partially overlapped. In each fingerprint identification unit 301, a plurality of pixel units 330 form a small pixel unit array, and two adjacent pixel units 330 among the plurality of pixel units 330 are closely arranged with no spacing therebetween.

In this embodiment, there is better correspondence between the plurality of pixel units 330 in the fingerprint identification unit 301 and the microlenses 310, the structure of the whole fingerprint identification unit 301 is relatively compact, and there is less stray light in the light signals received by the plurality of pixel units 330, so that the fingerprint imaging quality is better.

In some other embodiments, for any one fingerprint identification unit 301 in the apparatus 300 for identifying a fingerprint, orthogonal projections of only some pixel units 330 among the plurality of pixel units 330 and the microlenses 310 on the plane where the plurality of pixel units 330 are located are overlapped. That is, in the fingerprint identification unit 301 provided in this embodiment, the plurality of pixel units 330 corresponding to a same microlens 310 are not mutually compact and connected pixel unit arrays, and there is a spacing between two adjacent pixel units 330 among the plurality of pixel units 330. For example, two adjacent pixel units 300 are separated by an empty pixel unit (that is, pixel unit not used for detecting a light signal), or two adjacent pixel units 300 are separated by a pixel unit 330 corresponding to other microlenses 310.

Figure 15:
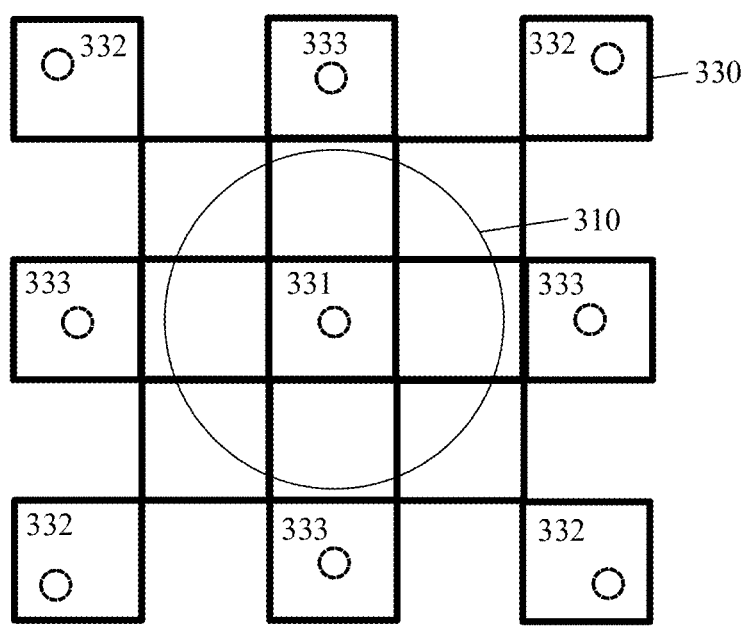
FIG. 15 is another schematic top view of a fingerprint identification unit provided in an embodiment of the present disclosure.

FIG. 15 shows another schematic top view of a fingerprint identification unit 301 provided in an embodiment of the present disclosure. For ease of illustration, FIG. 15 omits the non-underlying light blocking layer 322, and only shows the light-passing aperture in the underlying light blocking layer 321.

As shown in FIG. 15, in a fingerprint identification unit 301, there is a spacing between two adjacent pixel units 330 among the plurality of pixel units 330. For example, in FIG. 15, two adjacent pixel units 330 arranged in a horizontal row are separated by a pixel unit or an empty pixel unit in other fingerprint identification units 301. Similarly, two adjacent pixel units 330 arranged in a vertical row are also separated by a pixel unit or an empty pixel unit in other fingerprint identification units 301.

Among the plurality of pixel units 330 of the fingerprint identification unit 301, except for a first pixel unit 331 located at the center, second pixel units 332 located at four corners and third pixel units 333 located on four sides are all located outside the orthographic projection of the microlens 310 on the plane where the plurality of pixel units 330 are located. Compared with the fingerprint identification unit 301 in the embodiment shown in FIG. 7 above, the second pixel unit 332 and the third pixel unit 333 of the fingerprint identification unit 301 provided in the embodiment of the present disclosure have larger light collection angles, and therefore can be adapted to fingerprint identification scenarios where large light collection angles are required.

Through the technical solution of this embodiment, the pixel units 330 in the fingerprint identification unit 301 may have large light collection angles, thereby enabling the fingerprint identification unit 301 to be adapted to more application scenarios.

Various embodiments of the present disclosure are described in detail above with reference to the drawings. However, the present disclosure is not limited to the specific details of the above-mentioned embodiments. Within the scope of the technical concept of the present disclosure, multiple simple modifications can be made to the technical solutions of the present disclosure, and the simple modifications are all encompassed within the scope of protection of the present disclosure.

For example, specific technical features described in the above-mentioned specific embodiments can be combined in any suitable way in the case of no conflict. In order to avoid unnecessary repetitions, various possible combinations will not be separately described in the present disclosure.

For another example, any combination of various embodiments of the present disclosure may be performed, as long as the combination does not violate the concept of the present disclosure. The combination should also be regarded as the content disclosed in the present disclosure.

An embodiment of the present disclosure further provides an electronic device, which may include a display screen and the apparatus for identifying a fingerprint in the above embodiments of the present disclosure, where the apparatus for identifying a fingerprint is arranged below the display screen to implement under-display optical fingerprint identification.

The electronic device may be any electronic device with a display screen. For example, the electronic device may be the electronic device 10 shown in FIG. 1.

The display screen may be the display screen described above, such as an OLED display screen or other display screens. The description about the display screen in the above description may be referred to for relevant descriptions of the display screen, which will not be repeated here for simplicity.

Unless otherwise stated, all technical terms and scientific terms used in the embodiments of the present disclosure have the same meanings as commonly understood by those skilled in the technical field of the present disclosure. The terms used in the present disclosure are only for the purpose of describing specific embodiments, and are not intended to limit the scope of the present disclosure. The term "and/or" used in the present disclosure includes any and all combinations of one or more of the associated listed items.

It should be understood that the specific examples in the embodiments of the present disclosure are provided only to help those skilled in the art to better understand the embodiments of the present disclosure, rather than limiting the scope of the embodiments of the present disclosure. Those skilled in the art may make various improvements and modifications on the basis of the above embodiments, and these improvements or modifications all fall within the scope of protection of the present disclosure.

While the above description merely provides specific embodiments of the present disclosure, the scope of protection of the present disclosure is not limited to the specific embodiments. Any person skilled in the present technical field may easily conceive of various equivalent modifications or replacements within the technical scope disclosed in the present disclosure. All these modifications or replacements should be encompassed within the scope of protection of the present disclosure. Therefore, the scope of protection of the present disclosure shall be determined by the scope of protection of the claims.

What is claimed is:

1. An apparatus for identifying a fingerprint, being adapted to be arranged below a display screen of an electronic device to implement under-display optical fingerprint identification, wherein the apparatus for identifying a fingerprint comprises: a plurality of fingerprint identification units distributed in an array, and each fingerprint identification unit among the plurality of fingerprint identification units comprises:

a microlens;

at least two light blocking layers arranged below the microlens, wherein each light blocking layer among the at least two light blocking layers is provided with a light-passing aperture, and the light-passing aperture is configured to pass a fingerprint light signal which is returned after being reflected or scattered by a finger above the display screen and converged by the microlens; and a plurality of pixel units arranged below the at least two light blocking layers, wherein the light-passing apertures in the at least two light blocking layers form a plurality of light guiding channels corresponding to the plurality of pixel units, and the plurality of pixel units are arranged below the plurality of light guiding channels with one-to-one correspondence therebetween;

wherein the plurality of light guiding channels comprise a first light guiding channel and a second light guiding channel, an angle between a direction of the first light guiding channel and a first direction is a first angle, and an angle between a direction of the second light guiding channel and the first direction is a second angle, wherein the first angle is different from the second angle, and the first direction is a direction normal to a plane where the plurality of pixel units are located;

a position of a light-passing aperture in the first light guiding channel and located in an underlying light blocking layer among the at least two light blocking layers satisfies $0 \leq S_{11}/P_a \leq 1.4$, and a position of a light-passing aperture in the second light guiding channel and located in the underlying light blocking layer satisfies $0.75 \leq S_{12}/P_a \leq 2.8$, wherein $S_{11}$ is a distance from a center of the light-passing aperture in the first light guiding channel and located in the underlying light blocking layer to a center of projection of the microlens on the underlying light blocking layer, $S_{12}$ is a distance from a center of the light-passing aperture in the second light guiding channel and located in the underlying light blocking layer to the center of the projection of the microlens on the underlying light blocking layer, and $P_a$ is an arrangement period of the plurality of pixel units; and the plurality of pixel units comprise a first pixel unit corresponding to the first light guiding channel and a second pixel unit corresponding to the second light guiding channel, the first pixel unit is configured to receive a first fingerprint light signal transmitted through the first light guiding channel, the second pixel unit is configured to receive a second fingerprint light signal transmitted through the second light guiding channel, and the first fingerprint light signal and/or the second fingerprint light signal are/is used for fingerprint identification.

2. The apparatus for identifying a fingerprint according to claim 1, wherein a position of a light-passing aperture in the first light guiding channel and located in a non-underlying light blocking layer among the at least two light blocking layers satisfies $0 \leq S_{21}/P_a \leq 1.2$, and a position of a light-passing aperture in the second light guiding channel and located in a non-underlying light blocking layer satisfies $0.5 \leq S_{22}/P_a \leq 2.5$, wherein $S_{21}$ is a distance from a center of the light-passing aperture in the first light guiding channel and located in the non-underlying light blocking layer to a center of projection of the microlens on the non-underlying light blocking layer, and $S_{22}$ is a distance from a center of the light-passing aperture in the second light guiding channel and located in a non-underlying light blocking layer to the center of the projection of the microlens on the non-underlying light blocking layer.

3. The apparatus for identifying a fingerprint according to claim 1, wherein the positions of the light-passing apertures in the first light guiding channel and located in the underlying light blocking layer and the non-underlying light blocking layer of the at least two light blocking layers satisfy $0 \leq (S_{11}-S_{21})/(Z_1-Z_2) \leq 0.35$, and the positions of the light-passing apertures in the second light guiding channel and located in the underlying light blocking layer and the non-underlying light blocking layer satisfy $0.25 \leq (S_{12}-S_{22})/(Z_1-Z_2) \leq 0.8$, and $(S_{12}-S_{22})/(Z_1-Z_2) > (S_{11}-S_{21})/(Z_1-Z_2)$;

wherein $S_{21}$ is a distance from a center of the light-passing aperture in the first light guiding channel and located in the non-underlying light blocking layer to a center of projection of the microlens on the non-underlying light blocking layer, $S_{22}$ is a distance from a center of the light-passing aperture in the second light guiding channel and located in a non-underlying light blocking layer to a center of projection of the microlens on the non-underlying light blocking layer, $Z_1$ is a depth distance between a lower surface of the underlying light blocking layer and a lower surface of the microlens, and $Z_2$ is a depth distance between a lower surface of the non-underlying light blocking layer and the lower surface of the microlens.

4. The apparatus for identifying a fingerprint according to claim 3, wherein a position of a light-passing aperture in each light guiding channel among the plurality of light guiding channels and located in the underlying light blocking layer further satisfies $0 \leq S_1/Z_1 \leq 0.6$, wherein $S_1$ is a distance from a center of the light-passing aperture in the each light guiding channel and located in the underlying light blocking layer to a center of projection of the microlens on the underlying light blocking layer.

5. The apparatus for identifying a fingerprint according to claim 1, wherein the plurality of light guiding channels further comprise a third light guiding channel, an angle between a direction of the third light guiding channel and the first direction is a third angle, and the third angle is different from the first angle and the second angle; and the plurality of pixel units comprise a third pixel unit corresponding to the third light guiding channel, the third pixel unit is configured to receive a third fingerprint light signal transmitted through the third light guiding channel, and at least one of the first fingerprint light signal, the second fingerprint light signal, and the third fingerprint light signal is used for fingerprint identification.

6. The apparatus for identifying a fingerprint according to claim 5, wherein a position of a light-passing aperture in the third light guiding channel and located in the underlying light blocking layer satisfies $0.5 \leq S_{13}/P_a \leq 2.2$, wherein $S_{13}$ is a distance from a center of the light-passing aperture in the third light guiding channel and located in the underlying light blocking layer to a center of projection of the microlens on the underlying light blocking layer; and/or, a position of a light-passing aperture in the third light guiding channel and located in a non-underlying light blocking layer among the at least two light blocking layers satisfies $0.4 \leq S_{23}/P_a \leq 1.8$, wherein $S_{23}$ is a distance from a center of the light-passing aperture in the third light guiding channel and located in the non-underlying light blocking layer to a center of projection of the microlens on the non-underlying light blocking layer.

7. The apparatus for identifying a fingerprint according to claim 5, wherein the positions of the light-passing apertures in the third light guiding channel and located in the underlying light blocking layer and the non-underlying light blocking layer among the at least two light blocking layers satisfy $0.2 \leq (S_{13}-S_{23})/(Z_1-Z_2) \leq 0.7$ and $(S_{12}-S_{22})/(Z_1-Z_2) > (S_{13}-S_{23})/(Z_1-Z_2) > (S_{11}-S_{21})/(Z_1-Z_2)$;

wherein $S_{13}$ is a distance from a center of the light-passing aperture in the third light guiding channel and located in the underlying light blocking layer to a center of projection of the microlens on the underlying light blocking layer, $S_{23}$ is a distance from a center of the light-passing aperture in the third light guiding channel and located in the non-underlying light blocking layer to a center of the projection of the microlens on the non-underlying light blocking layer, $S_{21}$ is a distance from a center of the light-passing aperture in the first light guiding channel and located in the non-underlying light blocking layer to a center of projection of the microlens on the non-underlying light blocking layer, $S_{22}$ is a distance from a center of the light-passing aperture in the second light guiding channel and located in a non-underlying light blocking layer to a center of projection of the microlens on the non-underlying light blocking layer, $Z_1$ is a depth distance between a lower surface of the underlying light blocking layer and a lower surface of the microlens, and $Z_2$ is a depth distance between a lower surface of the non-underlying light blocking layer and the lower surface of the microlens.

8. The apparatus for identifying a fingerprint according to claim 1, wherein a maximum diameter $D_1$ of the light-passing aperture in the underlying light blocking layer and a maximum caliber CA of the microlens satisfy $0.005 \leq D_1/CA \leq 0.2$; and/or, a maximum diameter $D_2$ of the light-passing aperture in the non-underlying light blocking layer among the at least two light blocking layers and the maximum caliber CA of the microlens satisfy $0.05 \leq D_2/CA \leq 0.5$.

9. The apparatus for identifying a fingerprint according to claim 1, wherein a radius of curvature ROC of the microlens and a depth distance $Z_1$ between a lower surface of the underlying light blocking layer and a lower surface of the microlens satisfy $0.3 \leq ROC/Z_1 \leq 0.6$.

10. The apparatus for identifying a fingerprint according to claim 1, wherein a depth distance $Z_2$ between a lower surface of the non-underlying light blocking layer among the at least two light blocking layers and a lower surface of the microlens and a depth distance $Z_1$ between a lower surface of the underlying light blocking layer and the lower surface of the microlens satisfy $0.1 \leq Z_2/Z_1 \leq 0.9$.

11. The apparatus for identifying a fingerprint according to claim 1, wherein an arrangement period $P_b$ of the microlens in the apparatus for identifying a fingerprint and the arrangement period $P_a$ of the pixel units in the apparatus for identifying a fingerprint satisfy $3 \leq P_b/P_a$.

12. The apparatus for identifying a fingerprint according to claim 1, wherein an arrangement period $P_b$ of the microlens in the apparatus for identifying a fingerprint and the arrangement period $P_a$ of the pixel units in the apparatus for identifying a fingerprint satisfy $P_b/P_a=3$; and the position of the light-passing aperture in the first light guiding channel and located in the underlying light blocking layer among the at least two light blocking layers satisfies $0 \leq S_{11}/P_a \leq 0.7$, and the position of the light-passing aperture in the second light guiding channel and located in the underlying light blocking layer satisfies $0.7 \leq S_{12}/P_a \leq 2.1$.

13. The apparatus for identifying a fingerprint according to claim 12, wherein the position of the light-passing aperture in the first light guiding channel and located in the non-underlying light blocking layer among the at least two light blocking layers satisfies $0 \leq S_{21}/P_a \leq 0.5$, and the position of the light-passing aperture in the second light guiding channel and located in a non-underlying light blocking layer satisfies $0.5 \leq S_{22}/P_a \leq 1.9$, wherein $S_{21}$ is a distance from a center of the light-passing aperture in the first light guiding channel and located in the non-underlying light blocking layer to a center of projection of the microlens on the non-underlying light blocking layer, and $S_{22}$ is a distance from a center of the light-passing aperture in the second light guiding channel and located in a non-underlying light blocking layer to a center of projection of the microlens on the non-underlying light blocking layer.

14. The apparatus for identifying a fingerprint according to claim 12, wherein the plurality of light guiding channels further comprise a third light guiding channel, and a position of a light-passing aperture in the third light guiding channel and located in the underlying light blocking layer satisfies $0.5 \leq S_{13}/P_a \leq 1.5$, wherein $S_{13}$ is a distance from a center of the light-passing aperture in the third light guiding channel and located in the underlying light blocking layer to a center of projection of the microlens on the underlying light blocking layer; and/or, a position of a light-passing aperture in the third light guiding channel and located in the non-underlying light blocking layer among the at least two light blocking layers satisfies $0.4 \leq S_{23}/P_a \leq 1.3$, wherein $S_{23}$ is a distance from a center of the light-passing aperture in the third light guiding channel and located in the non-underlying light blocking layer to a center of the projection of the microlens on the non-underlying light blocking layer.

15. The apparatus for identifying a fingerprint according to claim 1, wherein an arrangement period $P_b$ of the microlens in the apparatus for identifying a fingerprint and the arrangement period $P_a$ of the pixel units in the apparatus for identifying a fingerprint satisfy $P_b/P_a=4$; and the position of the light-passing aperture in the first light guiding channel and located in the underlying light blocking layer among the at least two light blocking layers satisfies $0 \leq S_{11}/P_a \leq 1.4$, and the position of the light-passing aperture in the second light guiding channel and located in the underlying light blocking layer satisfies $1.4 \leq S_{12}/P_a \leq 2.8$.

16. The apparatus for identifying a fingerprint according to claim 15, wherein the position of the light-passing aperture in the first light guiding channel and located in the non-underlying light blocking layer among the at least two light blocking layers satisfies $0 \leq S_{21}/P_a \leq 1.2$, and the position of the light-passing aperture in the second light guiding channel and located in a non-underlying light blocking layer satisfies $1.2 \leq S_{22}/P_a \leq 2.5$, wherein $S_{21}$ is a distance from a center of the light-passing aperture in the first light guiding channel and located in the non-underlying light blocking layer to a center of projection of the microlens on the non-underlying light blocking layer, and $S_{22}$ is a distance from a center of the light-passing aperture in the second light guiding channel and located in a non-underlying light blocking layer to a center of the projection of the microlens on the non-underlying light blocking layer.

17. The apparatus for identifying a fingerprint according to claim 15, wherein the plurality of light guiding channels further comprise a third light guiding channel, and a position of a light-passing aperture in the third light guiding channel and located in the underlying light blocking layer satisfies $1 \leq S_{13}/P_a \leq 2.2$, wherein $S_{13}$ is a distance from a center of the light-passing aperture in the third light guiding channel and located in the underlying light blocking layer to a center of projection of the microlens on the underlying light blocking layer; and/or, a position of a light-passing aperture in the third guiding channel and located in the non-underlying light blocking layer among the at least two light blocking layers satisfies $0.8 \leq S_{23}/P_a \leq 1.8$, wherein $S_{23}$ is a distance from a center of the light-passing aperture in the third light guiding channel and located in the non-underlying light blocking layer to a center of the projection of the microlens on the non-underlying light blocking layer.

18. The apparatus for identifying a fingerprint according to claim 1, wherein the plurality of pixel units are an N×N pixel unit array, wherein N is a positive integer greater than 2.

19. The apparatus for identifying a fingerprint according to claim 18, wherein the plurality of pixel units are a 3×3 pixel unit array, and in the 3×3 pixel unit array, 1 pixel unit located at the center is the first pixel unit, and 4 pixel units located at four corners are 4 of the second pixel units; or, the plurality of pixel units are a 4×4 pixel unit array, and in the 4×4 pixel unit array, 2×2 pixel units located at the center are a plurality of the first pixel units, and 4 pixel units located at four corners are 4 of the second pixel units.

20. An electronic device, comprising:
a display screen; and
the apparatus for identifying a fingerprint according to claim 1, wherein the apparatus for identifying a fingerprint is arranged below the display screen, to implement under-display optical fingerprint identification.

* * * * *